(12) United States Patent
Boyer, Jr.

(10) Patent No.: US 9,108,717 B2
(45) Date of Patent: Aug. 18, 2015

(54) AIRCRAFT CARGO DOOR SHIELD

(71) Applicant: William J. Boyer, Jr., Lakewood, WA (US)

(72) Inventor: William J. Boyer, Jr., Lakewood, WA (US)

(*) Notice: Subject to any disclaimer, the term of this patent is extended or adjusted under 35 U.S.C. 154(b) by 23 days.

(21) Appl. No.: 14/160,015

(22) Filed: Jan. 21, 2014

(65) Prior Publication Data

US 2014/0203144 A1 Jul. 24, 2014

Related U.S. Application Data

(60) Provisional application No. 61/754,494, filed on Jan. 18, 2013.

(51) Int. Cl.
*B64C 1/14* (2006.01)

(52) U.S. Cl.
CPC .................. *B64C 1/1415* (2013.01)

(58) Field of Classification Search
CPC ...... B64C 1/14; B64C 1/1407; B64C 1/1415; B64C 1/1438; B64C 1/1461
See application file for complete search history.

(56) References Cited

U.S. PATENT DOCUMENTS

| | | | | |
|---|---|---|---|---|
| 4,073,452 A | * | 2/1978 | Gosau | 244/118.5 |
| 4,375,876 A | * | 3/1983 | Stewart | 244/129.5 |
| 5,520,358 A | * | 5/1996 | Kahn et al. | 244/129.5 |
| 2011/0121135 A1 | | 5/2011 | Maguire | |

FOREIGN PATENT DOCUMENTS

| | | |
|---|---|---|
| RU | 2166459 | 5/2001 |
| WO | 2009/063071 | 5/2009 |

* cited by examiner

*Primary Examiner* — Brian M O'Hara
(74) *Attorney, Agent, or Firm* — Davis Wright Tremaine LLP; George C. Rondeau, Jr.

(57) ABSTRACT

A cargo door shield system comprising a cargo door cover movable between a shield position below the fully opened cargo door, and a storage position permitting the cargo door to be moved uninhibited by the cover between the closed and fully opened positions. The system including a pair of spaced apart guide tracks movably supporting the cover for movement between the shield and storage positions, and extending below and spaced apart from the cargo door when the cargo door is in the fully opened position and being spaced apart sufficient to permit passage of the cargo door therebetween when the cargo door is moved between the closed and fully opened positions.

48 Claims, 15 Drawing Sheets

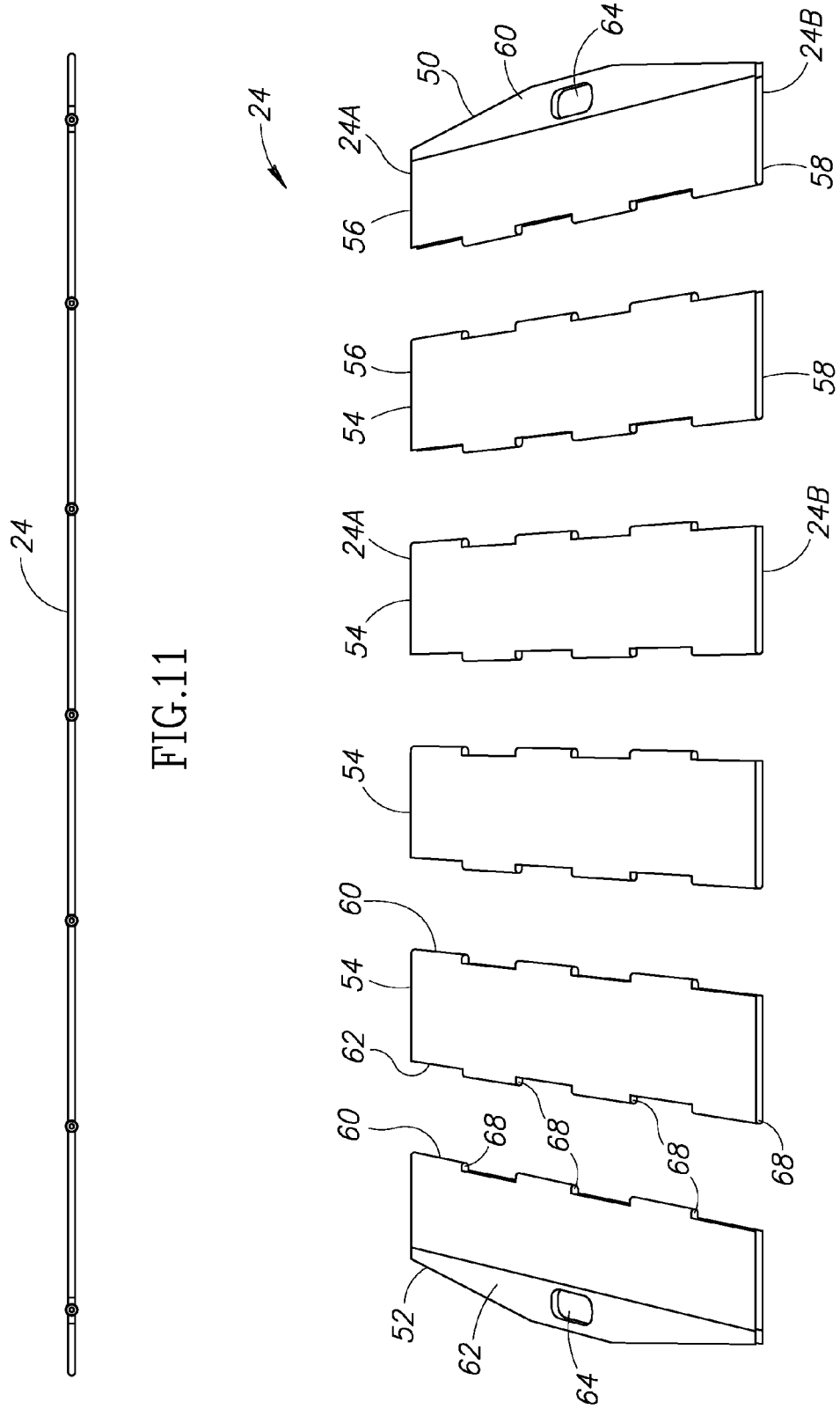

AIRCRAFT CARGO DOOR SHIELD

CROSS-REFERENCE TO RELATED APPLICATION

The present application claims priority from U.S. Provisional Application Ser. No. 61/754,494, filed Jan. 18, 2013, which is hereby incorporated by reference in its entirety.

BACKGROUND OF THE INVENTION

1. Field of the Invention

The present invention is directed generally to aircraft cargo door shields used to prevent damage to aircraft cargo doors during loading and unloading of cargo.

2. Description of the Related Art

The cargo door of a jet aircraft, such as a Boeing 737, is hinged at the top to the frame of a doorway and when opened is rotated inward and toward the ceiling of the cargo bay, also known as the cargo hold. This positions the exterior skin of the cargo door facing downward toward the floor of the cargo bay. The cargo bay is where luggage and other types of cargo (hereinafter both being referred to as "cargo") are placed for transport with the aircraft. When cargo is being loaded into or unloaded from the cargo bay, due to the limited height of the cargo bay it is not unusual for the cargo to occasionally contact the exterior skin of the opened cargo door. Such contact can damage the exterior skin of the cargo door.

When the cargo door is closed the exterior skin of the damage cargo door serves as a portion of the exterior skin of the aircraft body. If the damage is more than minor, a repair of the exterior skin of the cargo door is required. A significantly enough damaged exterior skin of the cargo door can impact airworthiness of the aircraft. Such repairs can cause flight delays and be expensive. Of course, even minor damage impacts the appearance of the aircraft.

In the past, foam pads attached to the exterior skin of the cargo door have been used to minimize the damage caused by cargo contacting the cargo door during loading and unloading of cargo. While a significant step toward protection of the cargo door, the pads must be manually attached to the cargo door and removed from the cargo door and stored for their next use. If for some reason a cargo handler does not install the foam pad on the cargo door, there is a danger that damage will result to the cargo door.

BRIEF DESCRIPTION OF THE SEVERAL VIEWS OF THE DRAWINGS

FIG. 11 is a side elevational view of the cover shown disassembled from the aircraft cargo door shield system of FIG. 1 and displayed flat.

FIG. 12 is a perspective view of the disassembled panels comprising the cover shown in FIG. 10.

DETAILED DESCRIPTION OF THE INVENTION

Figure 1:
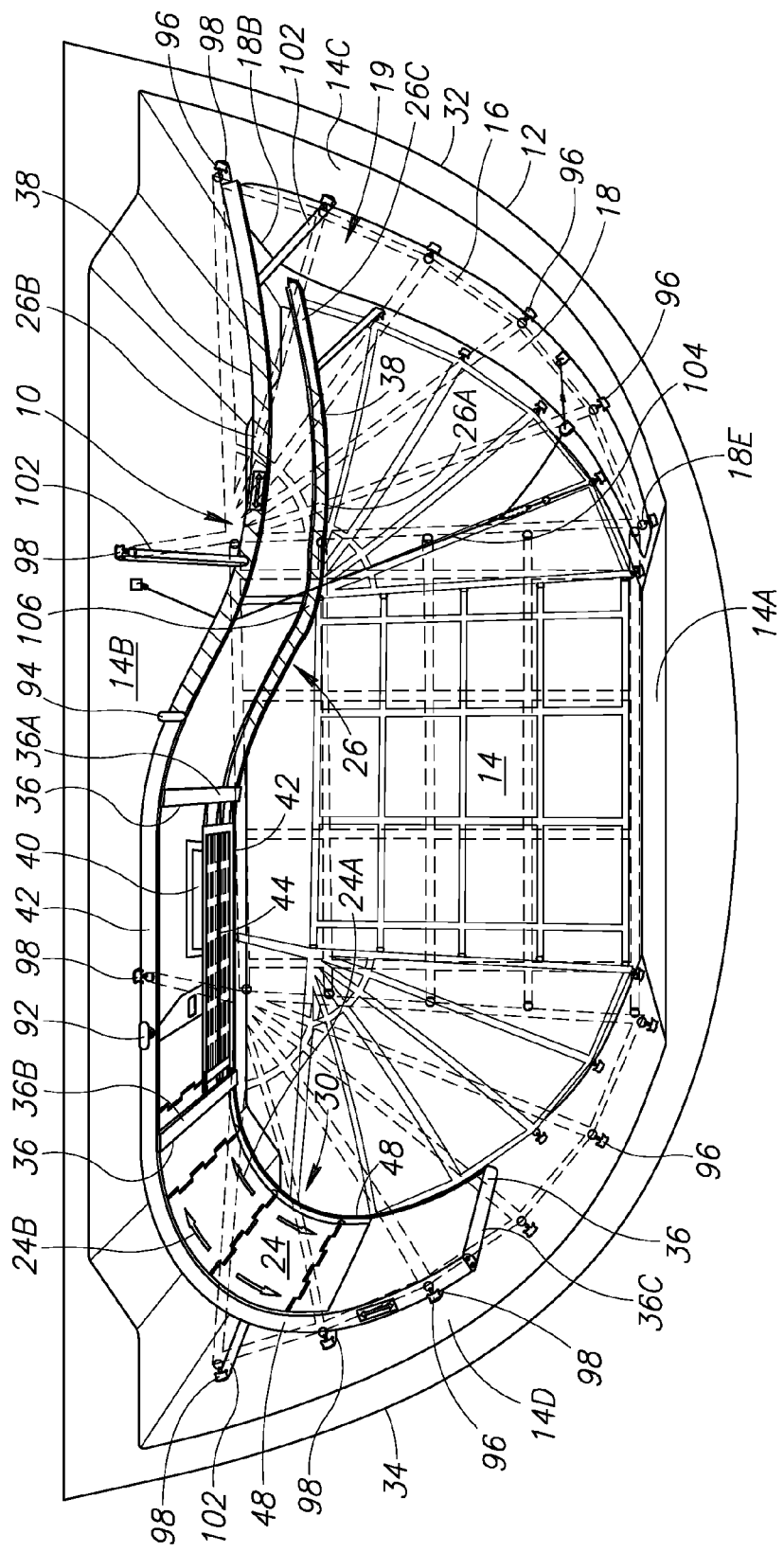
FIG. 1 is a rear perspective view of an aircraft cargo door shield system in accordance with an embodiment of the present invention installed in the cargo bay of an aircraft which is shown in cross-section with the cargo bay door in the closed position and a flexible cover in a cover storage position adjacent the port side of the aircraft.

The present invention is directed to an aircraft cargo door shield system 10. In FIG. 1, the cargo door system 10 is illustrated installed on a Boeing 737 jet aircraft 12, but the principals of the invention may be used on a wide variety of jet aircraft and other type aircraft, as well as other type means of transporting cargo where damage to a door for a portal through which the cargo passes is in position when opened to be damaged during handling of the cargo. The aircraft 12 has a cargo bay 14 with a cargo bay floor 14A on which cargo rests when in the cargo bay. Cargo is loaded into the cargo bay 14 for transportation to and unloading at another location to which the aircraft travels.

The cargo bay 14 has a portal or doorway 16 with a cargo door 18. The cargo door 18 has an exterior skin 18A which forms a portion of the exterior skin of the aircraft 12 when the cargo door is moved into a closed position 19 (shown in FIG. 1). The cargo door 18 has an upper end portion 18B hinged to a frame member 20 of the aircraft 12 located at the top of the doorway 16 such that when the cargo door is moved from the closed position 19 to a fully opened position 21, the cargo door is rotated inward into the cargo bay 14 and upward toward a ceiling 14B of the cargo bay 14, which places the cargo door when in the fully opened position adjacent to the ceiling of the cargo bay with the exterior skin 18A of the cargo door facing downward toward the cargo bay floor 14A. The cargo door 18 remains in this fully opened position 21 while cargo is being loaded into and unloaded from the cargo bay 14 through the cargo door 18. This positions the exterior skin 18A of the cargo door 18 facing downward and above the cargo as the cargo passes thereunder when being loaded into and unloaded from the cargo bay 14, and subjects the exterior skin of the cargo door to potential damage if contacted by the cargo passing thereunder.

As shown in FIG. 1, the cargo door shield system 10 of the present invention is located within the cargo bay 14 of the aircraft 12 for protection of the downward facing exterior skin 18A of the cargo door 18 when the cargo door is in the fully opened position as the cargo passes under the cargo door for loading cargo into or unloading of cargo from the cargo bay through the opened cargo door. If the cargo is moved in a manner that would otherwise contact the exterior skin 18A of the cargo door 18, the cargo door shield system 10 prevents the contact from happening, thereby reducing damage to the cargo door.

Figure 2:
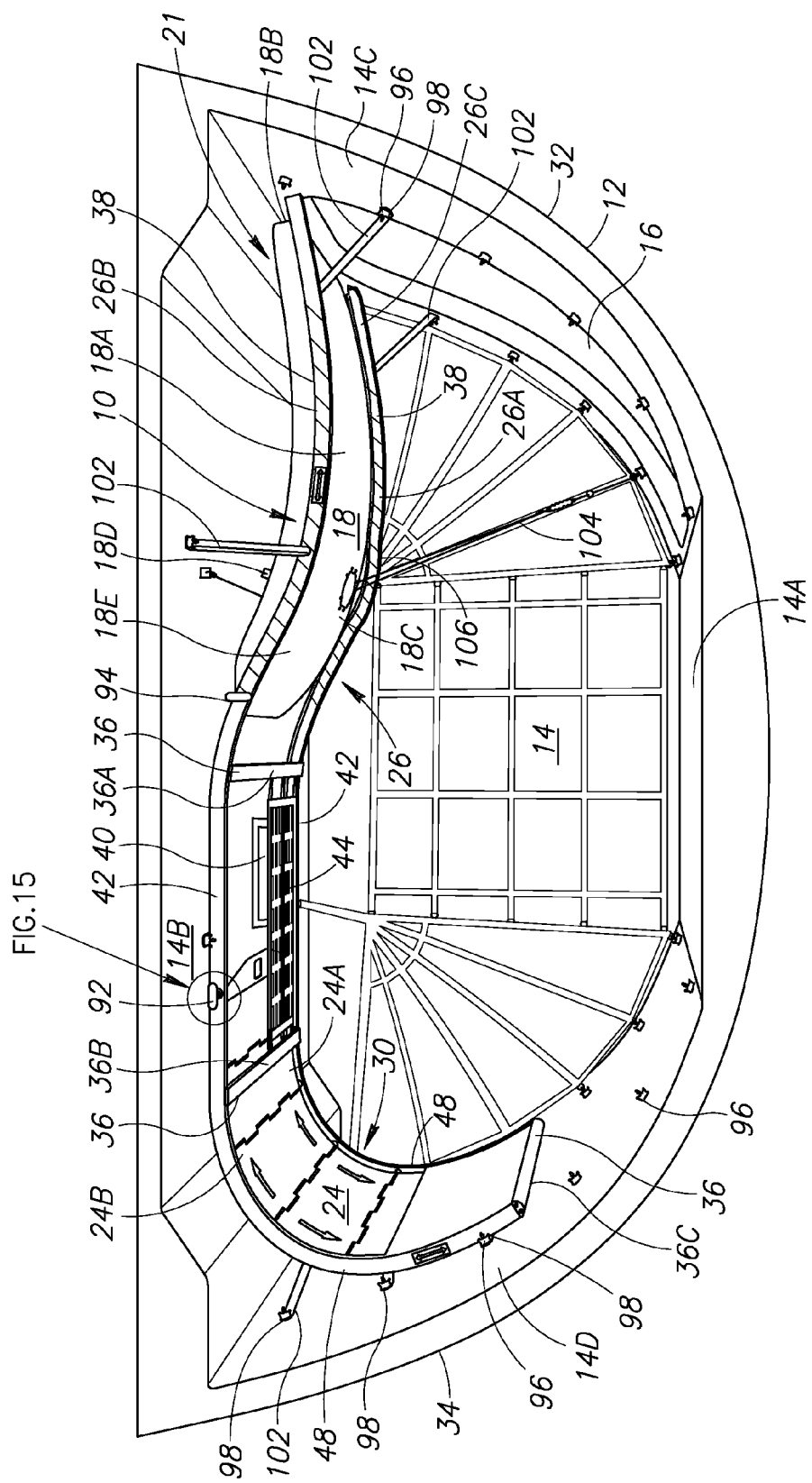
FIG. 2 is a rear perspective view of an aircraft cargo door shield system of FIG. 1 installed in the cargo bay of the aircraft which is shown in cross-section with the cargo bay door in the fully opened position and the cover in a cover storage position adjacent the port side of the aircraft.
Figure 3:
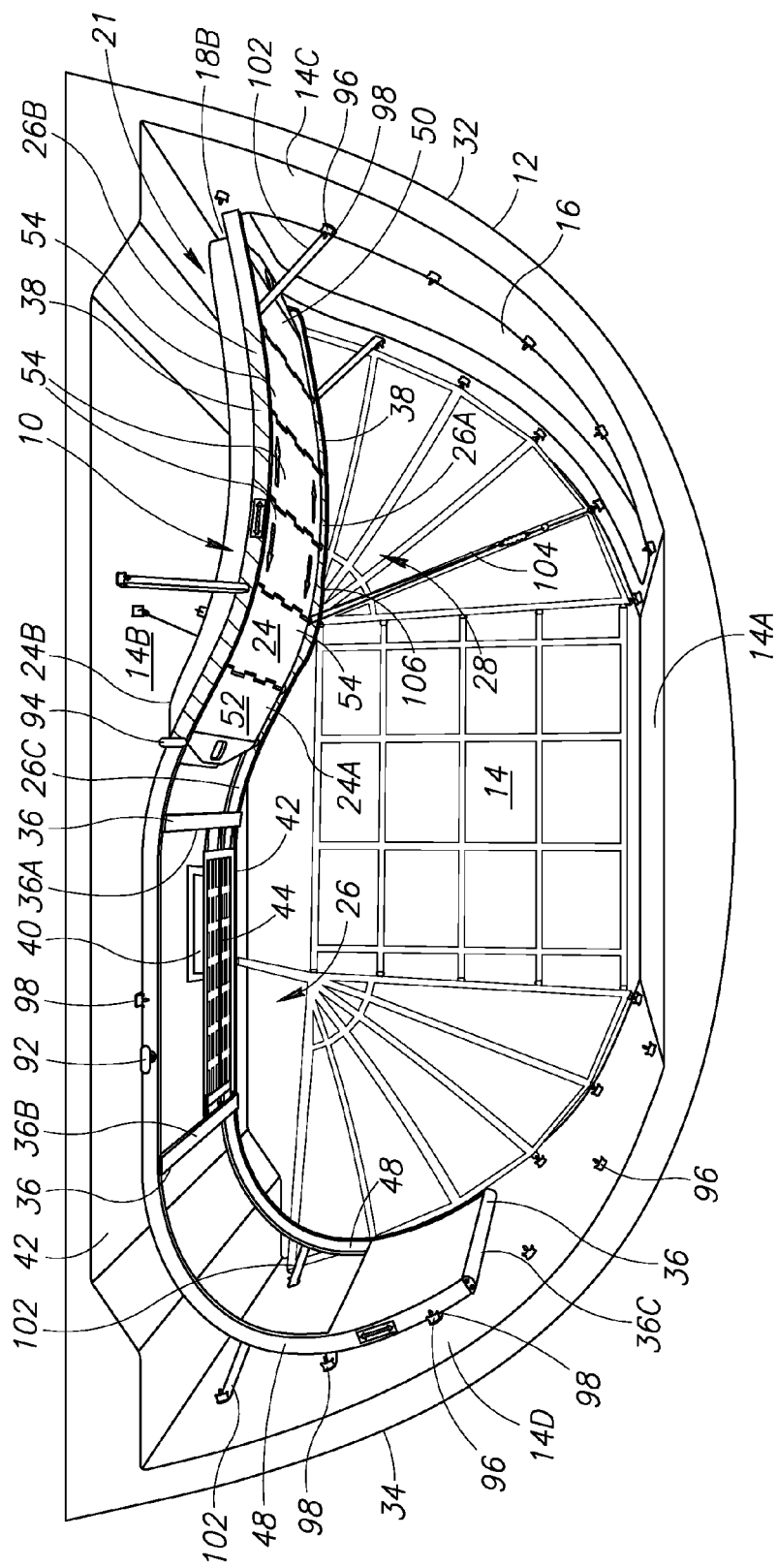
FIG. 3 is a rear perspective view of an aircraft cargo door shield system of FIG. 1 installed in the cargo bay of an aircraft which is shown in cross-section with the cargo bay door in the fully opened position and the cover in a shield position beneath the door for protection of the downward facing exterior skin of the door.
Figure 4:
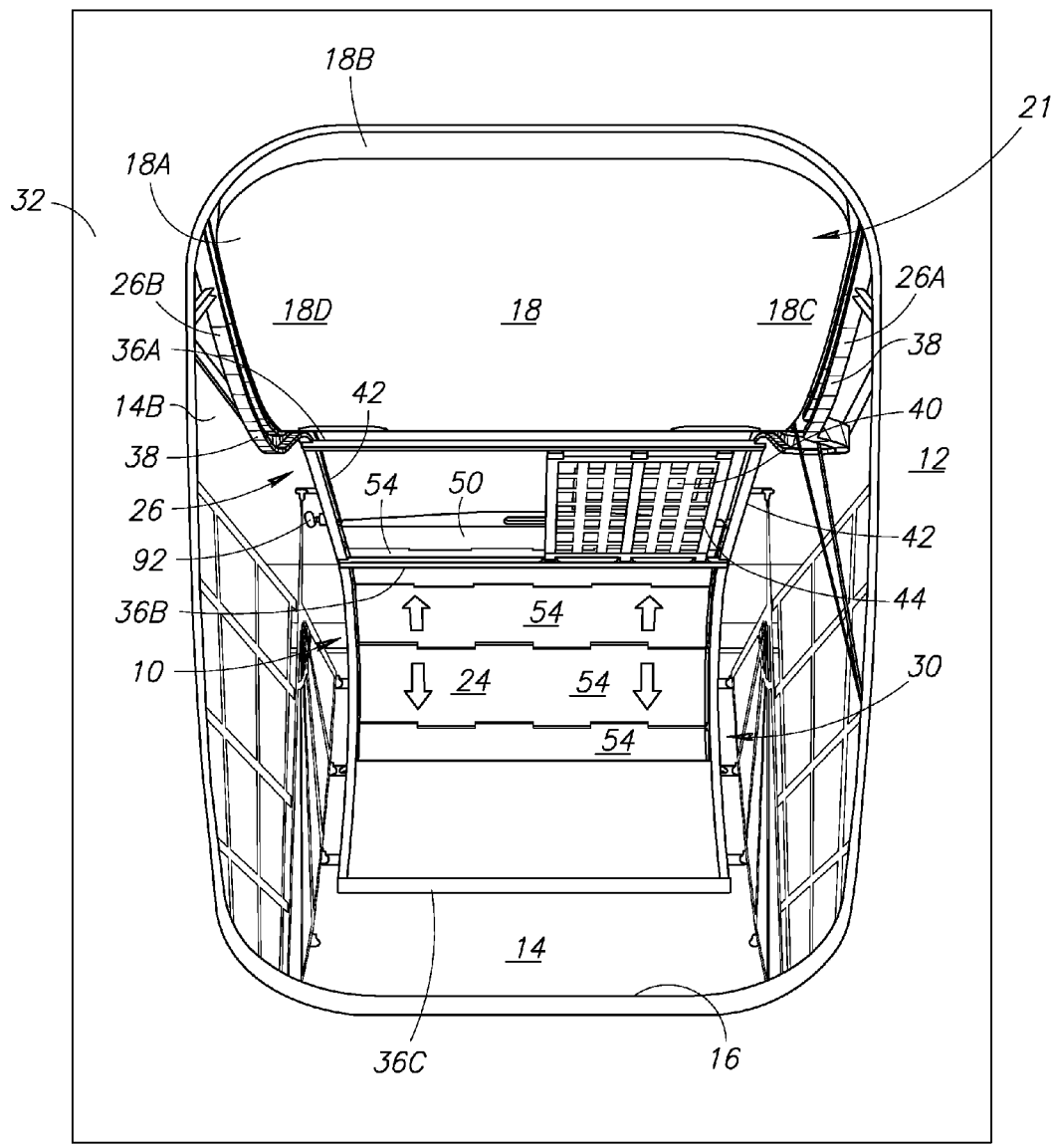
FIG. 4 is a starboard side elevational view of the aircraft looking from outside through the doorway of the cargo bay of the aircraft with the cargo bay door in the fully opened position and the cover in the storage position as shown in FIG. 2.
Figure 5:
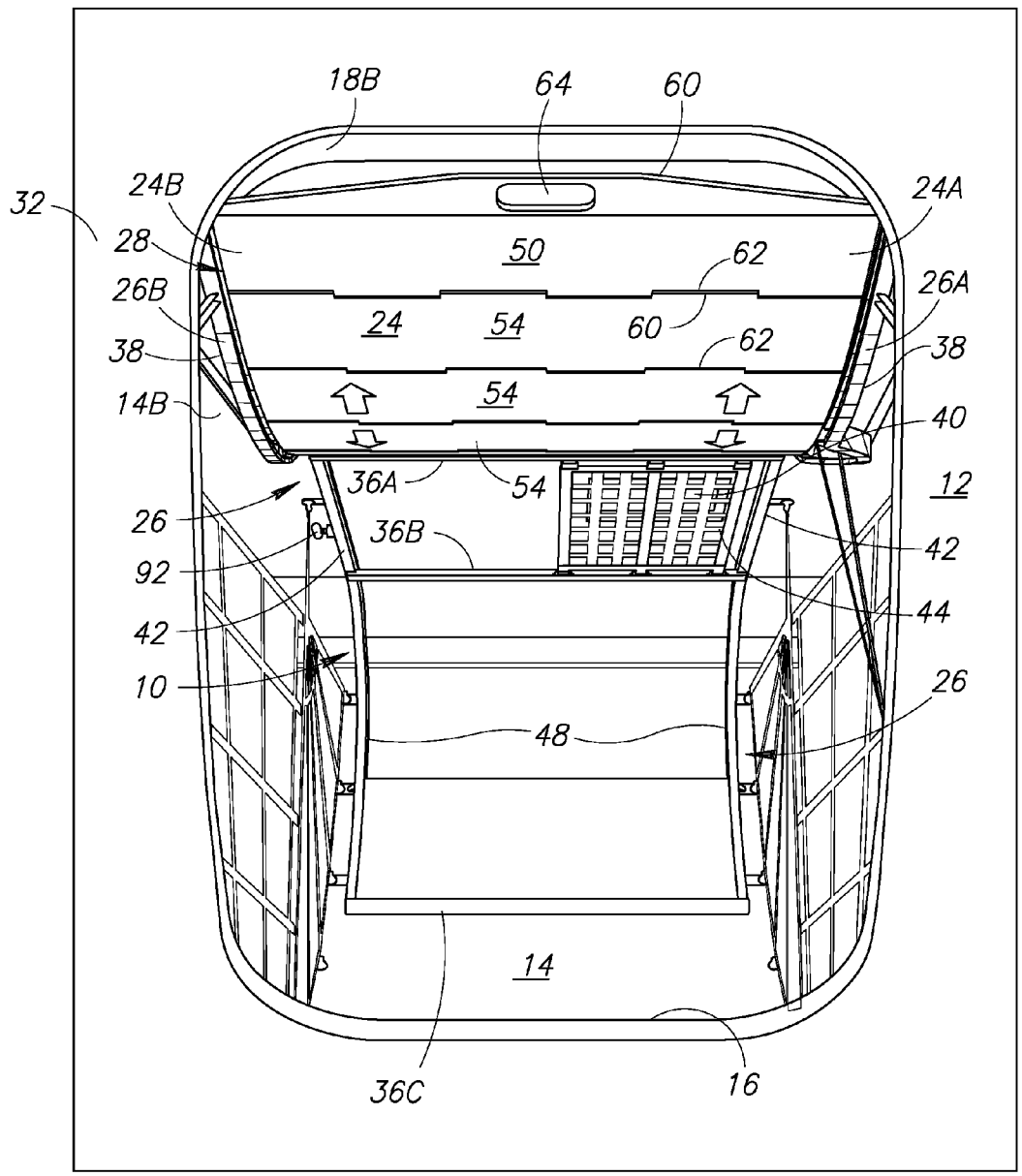
FIG. 5 is a starboard side elevational view of the aircraft looking from outside through the doorway of the cargo bay of the aircraft with the cargo bay door in the fully opened position and the cover in the shield position as shown in FIG. 3.

In one embodiment, the cargo door shield system 10 includes a flexible shield or cover 24 of a design somewhat like the rolling top or front of a roll top desk, which is guided by a pair of spaced-apart parallel guide tracks 26 so that the cover is movable between a shield position 28 below the exterior skin 18A of the cargo door 18 when the cargo door is moved into the fully opened position for loading and unloading of cargo through the doorway 16 as shown in FIGS. 3 and 5, and a storage position 30 when the cargo door is to be placed in the closed position 19 for flight or other movement of the aircraft 12 as shown in FIGS. 1, 2 and 4. When in the shield position 28, the cover 24 shields the exterior skin 18A of the open cargo door from damage by contact with cargo while it is being loaded into or removed from the cargo bay.

The guide tracks 26 include a forward first guide track 26A and a rearward second guide track 26B, with both extending from a first interior sidewall 14C of the cargo bay 14 in which the doorway 16 is located on a first side 32 of the aircraft 12 (the starboard side for a Boeing 737) toward an opposite second interior sidewall 14D of the cargo bay on a second side 34 of the aircraft (the port side for a Boeing 737), generally transverse to the longitudinal axis of the aircraft.

The forward guide track 26A is located at a forward side of the doorway 16 and the rearward guide track 26B is located at a rearward side of the doorway. As will be described in greater detail below, the forward and rearward guide tracks 26A and 26B are held in fixed parallel spaced arrangement by a plurality of cross-members 36 attached to and extending between the forward and rearward guide tracks, and also by the attachment of the forward and rearward guide tracks to the ceiling 14B, first interior sidewall 14C and second interior sidewall 14D of the cargo bay 14.

First lengthwise sections 38 of the forward and rearward guide tracks 26A and 26B extending from the first side 32 of the aircraft 12 toward the second side 34 of the aircraft are spaced apart a distance sufficient to allow the cargo door 18 to pass unimpeded between the forward and rearward guide tracks when the cargo door is moved between the closed position 19 and the fully opened position 21. The first lengthwise sections 38 of the forward and rearward guide tracks 26A and 26B have a curvature generally matching the curvature of the exterior skin 18A of the cargo door 18, and are positioned such that when the cargo door is in the fully opened position 21 the forward guide track 26A is located below and is curved to generally match the curvature of a forward edge portion 18C of the exterior skin of the cargo door and the rearward guide track 26B is located below and is curved to generally match the curvature of a rearward edge portion 18D of the exterior skin of the cargo door. The first lengthwise sections 38 of the forward and rearward guide tracks 26A and 26B have no cross-members 36 extending between the forward and rearward tracks in a position that would block the passage of the cargo door when moved between the closed position 19 and the fully opened position 21. The first lengthwise sections 38 of the forward and rearward guide tracks 26A and 26B extend from the first side 32 of the aircraft 12, generally with a curvature matching the curvature of the cargo door 18 and continue to curve upward to a location adjacent to the ceiling 14B of the cargo bay 14.

A first cross-member 36A positioned adjacent to the ceiling 14B of the cargo bay 14 has a forward end portion attached to the forward guide track 26A and a rearward end portion attached to the rearward guide track 26B, and serves as a rigid spacer to keep the forward and rearward tracks properly spaced apart. The first cross-member 36A is located along the forward and rearward guide tracks sufficiently far from the a first interior sidewall 14C of the cargo bay 14 such that when the cargo door is in the fully opened position 21 the first cross-member is located sufficiently toward the second side 34 of the aircraft 12 to be beyond a lower end portion 18E of the cargo door 18. This prevents the first cross-member 36A from blocking the passage of the cargo door 18 when moved between the closed position 19 and the fully opened position 21.

In the illustrated embodiment of the aircraft 12, the ceiling 14B of the cargo bay 14 has a ceiling panel 40 that acts both as a decompression panel and an access door for a hatch between the main passenger cabin and the cargo bay. The first cross-member 36A is located along the forward and rearward guide tracks 26A and 26B to a side of the ceiling panel 40 toward the first interior sidewall 14C of the cargo bay 14, in a position between the ceiling panel and the lower end portion 18E of the cargo door 18 when the cargo door is in the fully opened position 21 so as not to restrict removal of the ceiling panel 40 or movement through the hatch when the ceiling panel is removed.

Second lengthwise sections 42 of the forward and rearward guide tracks 26A and 26B extend from the first cross-member 36A to a second cross-member 36B positioned adjacent to the ceiling 14B of the cargo bay 14 and having a forward end portion attached to the forward guide track 26A and a rearward end portion attached to the rearward guide track 26B. The second cross-member 36B serves as a rigid spacer to keep the forward and rearward tracks properly spaced apart. The second cross-member 36B is located along the forward and rearward guide tracks to a side of the ceiling panel 40 toward second interior sidewall 14D of the cargo bay 14, in a position so as not to restrict removal of the ceiling panel 40 or movement through the hatch when the ceiling panel is removed. The second lengthwise sections 42 of the forward and rearward guide tracks 26A and 26B are relatively straight and oriented generally horizontally.

The second lengthwise sections 42 of the forward and rearward guide tracks 26A and 26B are spaced apart by the same distance as the first lengthwise sections 38 of the forward and rearward guide tracks 26A and 26B, and are positioned with the forward guide track 26A located forward of the ceiling panel 40 and the rearward guide track 26B located rearward of the ceiling panel. With this arrangement of the second lengthwise sections 42 of the forward and rearward guide tracks 26A and 26B having the ceiling panel 40 located therebetween, the second lengthwise sections of the forward and rearward guide tracks do not restrict removal of the ceiling panel or movement through the hatch when the ceiling panel is removed. It is noted that the location of the ceiling panel 40 is closer to the forward guide track 26A than to the rearward guide track 26B.

Figure 6:
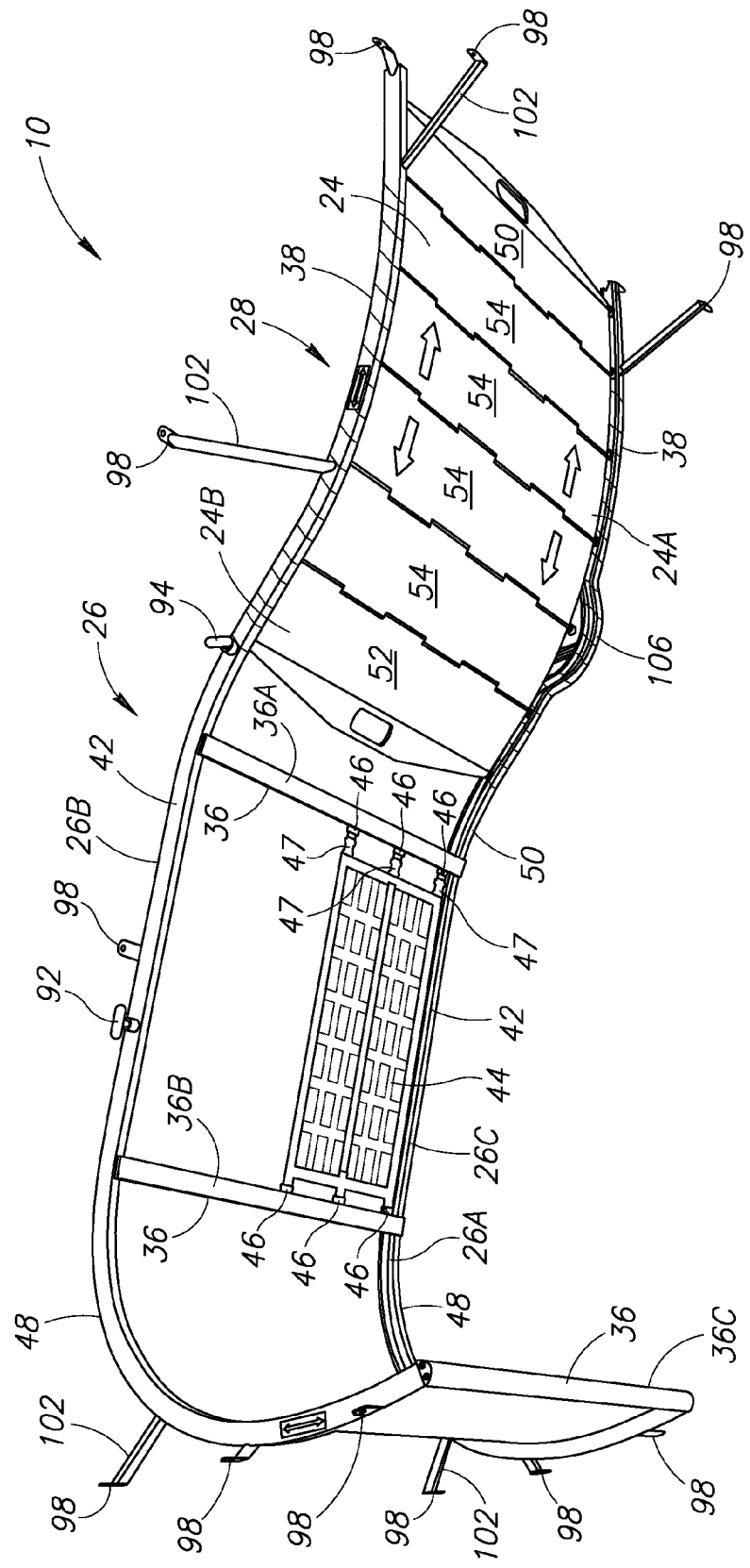
FIG. 6 is a bottom perspective view of the aircraft cargo door shield system of FIG. 1 before installation in an aircraft and with the cover in the shield position.
Figure 7:
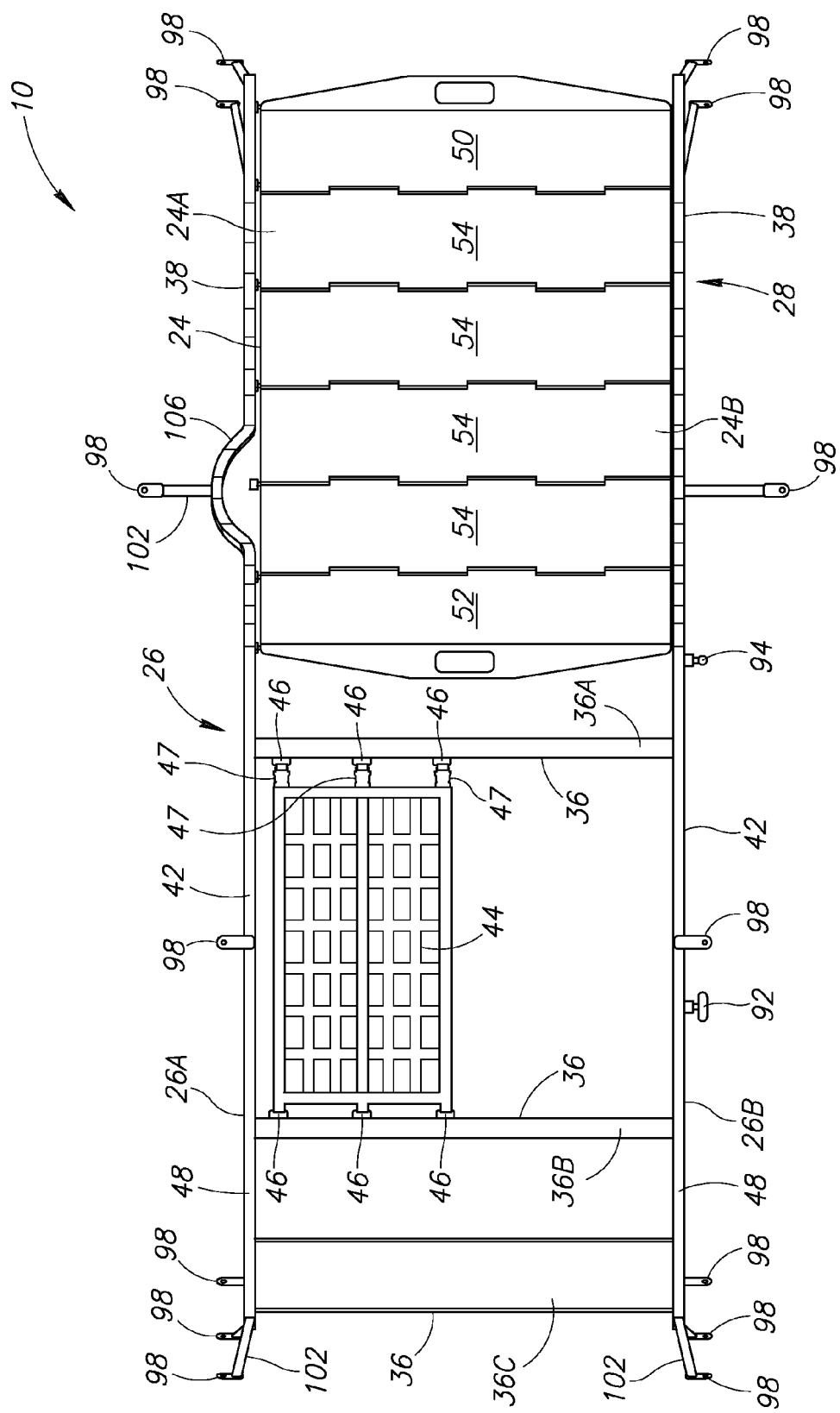
FIG. 7 is a top plan view of the aircraft cargo door shield system of FIG. 1 before installation in an aircraft and with the cover in the shield position.
Figure 8:
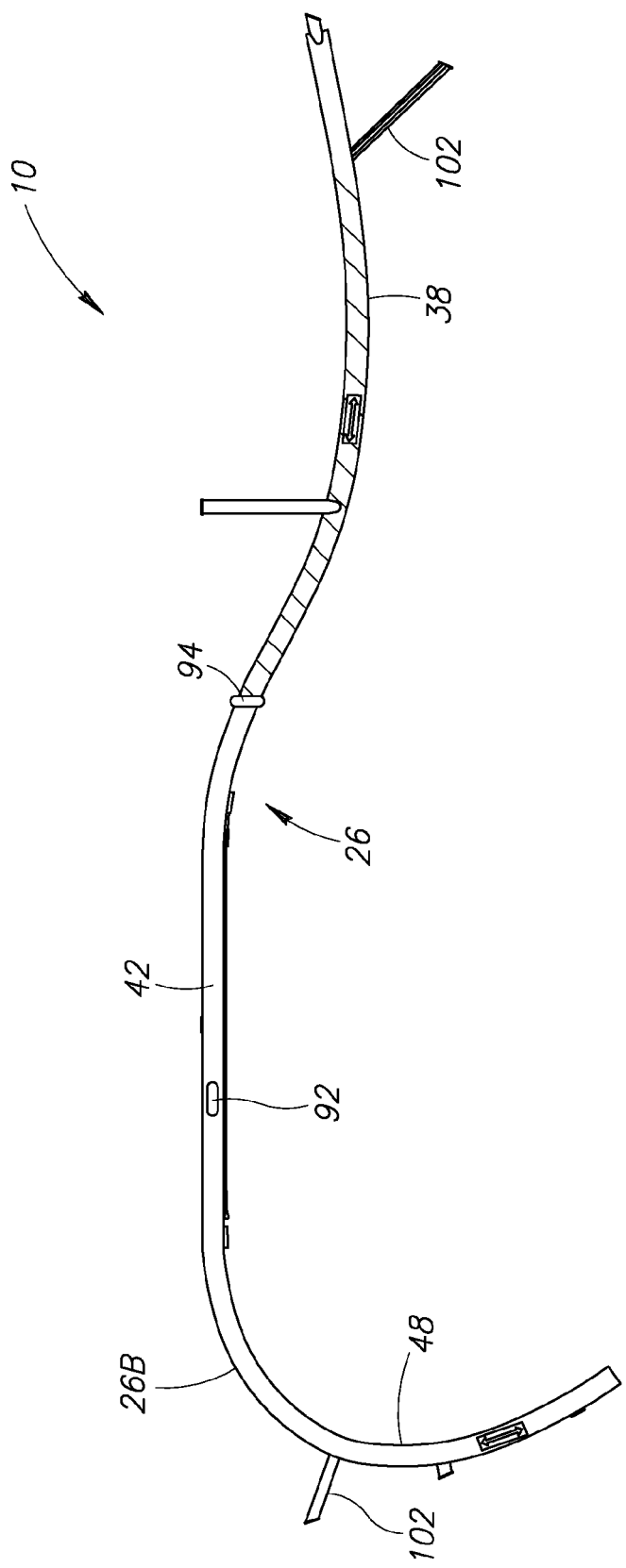
FIG. 8 is a side elevational view of the aircraft cargo door shield system of FIG. 1 before installation in an aircraft and with the cover in the shield position.

To provide protection for the ceiling panel 40 from cargo contacting the ceiling panel and thereby dislodge or damage the ceiling panel when cargo is being moved around within the cargo bay 14 during loading and unloading of the cargo or as a result of cargo shifting during flight, a net 44 which spans between the first and second cross-members 36A and 36B at a sufficient distance spaced below the ceiling panel that cargo contacting the net will be stopped from moving into contact with the ceiling panel. Preferably, the net extends at least coextensive with the ceiling panel. To releasable hold the net 44 in position, an inward facing wall portions of the first and second cross-members 36A and 36B each have three spaced apart, footman loops 46 (best seen in FIGS. 6 and 7). Since the ceiling panel 40 is located closer to the forward guide track 26A than to the rearward guide track 26B, the loops 46 are similarly located closer to the forward guide track 26A than to the rearward guide track 26B resulting in the net 44 covering about the forward half of the area between the forward and rearward guide tracks 26A and 26B. The net 44 has end straps at one end that each extend through one of the loops 46 of the second cross-member 36B to securely retain that end of the net thereto, and the opposite end of the net has quick release clips 47 which releasable secure that end of the net to the loops 46 of the first cross-member 36A and provide for quick release of at least one end of the net so that when desired the ceiling panel can be removed and movement through the hatch is not restricted.

Third lengthwise sections 48 of the forward and rearward guide tracks 26A and 26B extend from the second cross-member 36B positioned adjacent to the ceiling 14B of the cargo bay 14 to a third cross-member 36C positioned adjacent to the second interior sidewall 14D of the cargo bay 14 at the second side 34 of the aircraft 12. The third cross-member 36C has a forward end portion attached to the forward guide track 26A and a rearward end portion attached to the rearward guide track 26B, and serves as a rigid spacer to keep the forward and rearward tracks properly spaced apart. The third cross-member 36C is located along the forward and rearward guide tracks at the terminal end portions of the tracks. Starting at the second cross-member 36B, the third lengthwise sections 48 of the forward and rearward guide tracks 26A and 26B curve outward toward the second interior sidewall 14D of the cargo bay 14 and then downward toward the cargo bay floor 14A and terminate adjacent to the second interior sidewall at a location above the cargo bay floor at about a midportion of the second interior sidewall 14D. The third lengthwise sections 48 of the forward and rearward guide tracks 26A and 26B are spaced apart by the same distance as the first lengthwise sections 38 of the forward and rearward guide tracks 26A and 26B. When the cover 24 is moved along the forward and rearward guide tracks 26A and 26B into the storage position 30, the cover is being guided and retained by the third lengthwise sections 48 of the forward and rearward guide tracks 26A and 26B and the cover is positioned essentially along the second interior sidewall 14D of the cargo bay 14.

The third lengthwise sections 48 of the forward and rearward guide tracks 26A and 26B allow the cover 24 when moved into the storage position 30 for flight or other movement of the aircraft 12 to be in a position clear of the ceiling panel 40 so as to not restrict removal of the ceiling panel or movement through the hatch when the ceiling panel is removed. If an aircraft does not use a ceiling panel 40 at a location inward from the cargo doorway 16, such as is the situation with the rear cargo door of a Boeing 737, the aircraft cargo door shield system 10 will not require use of three lengthwise sections and the forward and rearward guide tracks 26A and 26B can terminate with the second lengthwise sections 42 of the forward and rearward guide tracks, which would position the cover 24 essentially along the ceiling 14B of the cargo bay 14 when the cover 24 is moved along the forward and rearward guide tracks 26A and 26B into the storage position 30.

The forward and rearward guide tracks 26A and 26B each have a laterally inward opening interior channel 26C with a longitudinally extending side opening 26D (see FIG. 16) extending substantially the full length of the channel and facing inward toward the side opening of the channel of the other guide track. In other words, the channel 26C of the forward guide track 26A has a side opening 26D facing rearward, and the channel of the rearward guide track 26B has a side opening facing forward, with corresponding portions of the forward and rearward guide tracks 26A and 26B along the length of the guide tracks being aligned.

The cover 24 has a forward edge portion 24A which is guided by the forward guide track 26A and a rearward edge portion 24B which is guided by the rearward guide track 26B as the cover is moved between the shield position 28 and the storage position 30. In the illustrated embodiment of the cover 24, the cover has spaced apart along each of its forward and rearward edge portions 24A and 24B a plurality of wheels 53 (see FIGS. 9, 10 and 14) sized to be positioned within the channel 26C of the corresponding forward and rearward guide tracks 26A and 26B (see FIG. 16).

Figure 9:
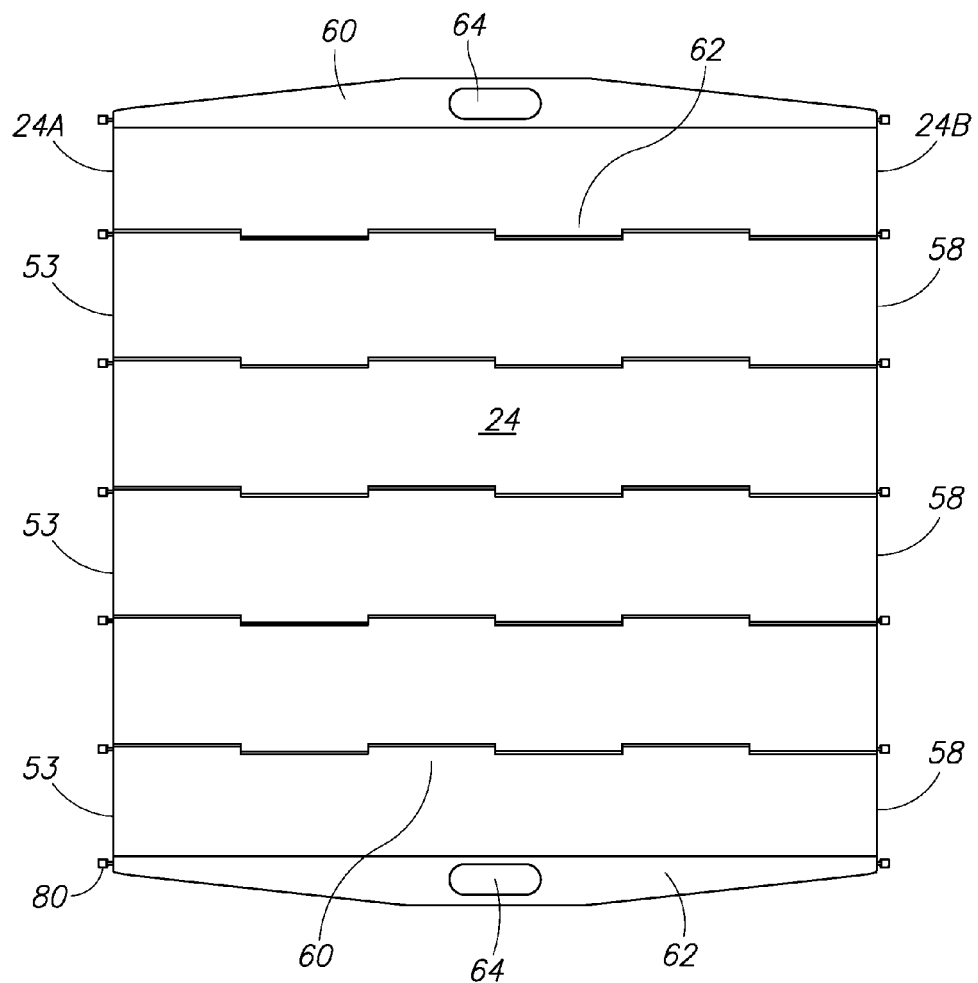
FIG. 9 is a plan view of the rear side of the cover shown disassembled from the aircraft cargo door shield system of FIG. 1 and displayed flat.
Figure 10:
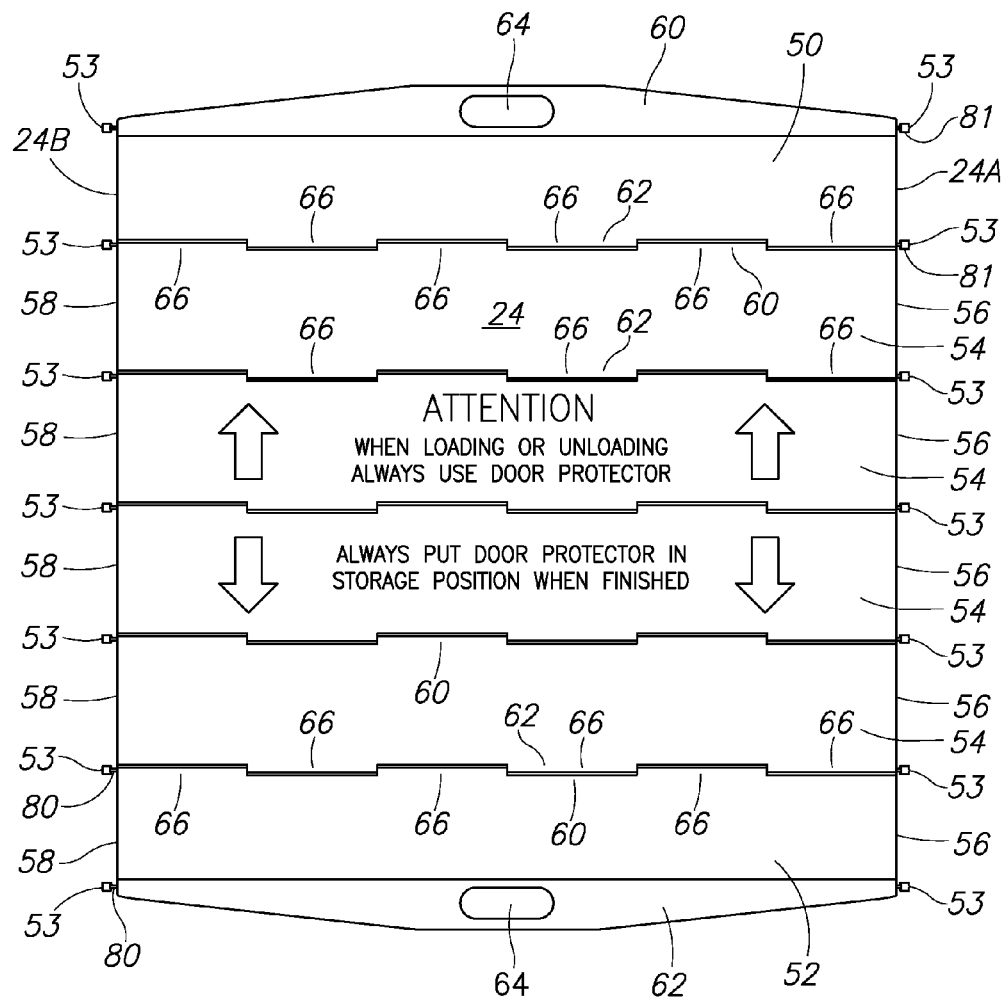
FIG. 10 is a plan view of the front side of the cover shown disassembled from the aircraft cargo door shield system of FIG. 1 and displayed flat.

As best seen in FIGS. 9 and 10, the illustrated embodiment of the cover 24 further includes a first end panel segment 50, a second end panel segment 52 and four middle panel segments 54 positioned between the first and second end panel segments. Each of the first panel segment, the second panel segment and the middle panel segments has a forward edge portion 56 and a rearward edge portion 58, which together form the forward and rearward edge portions 24A and 24B, respectively, of the cover 24. Each of the first panel segment, the second panel segment and the middle panel segments also has first lateral edge portion 60 toward the first side 32 of the aircraft 12 and a second lateral edge portion 62 toward the second side 34 of the aircraft. The first lateral edge portion 60 of the first end panel segment 50 and the second lateral edge portion 62 of the second end panel segment 52 have a handhold opening 64 sized to receive the hand of a user therein to manually grab hold of and move the cover 24 along the forward and rearward guide tracks 26A and 26B between the shield position 28 and the storage position 30 as desired.

Figure 13:
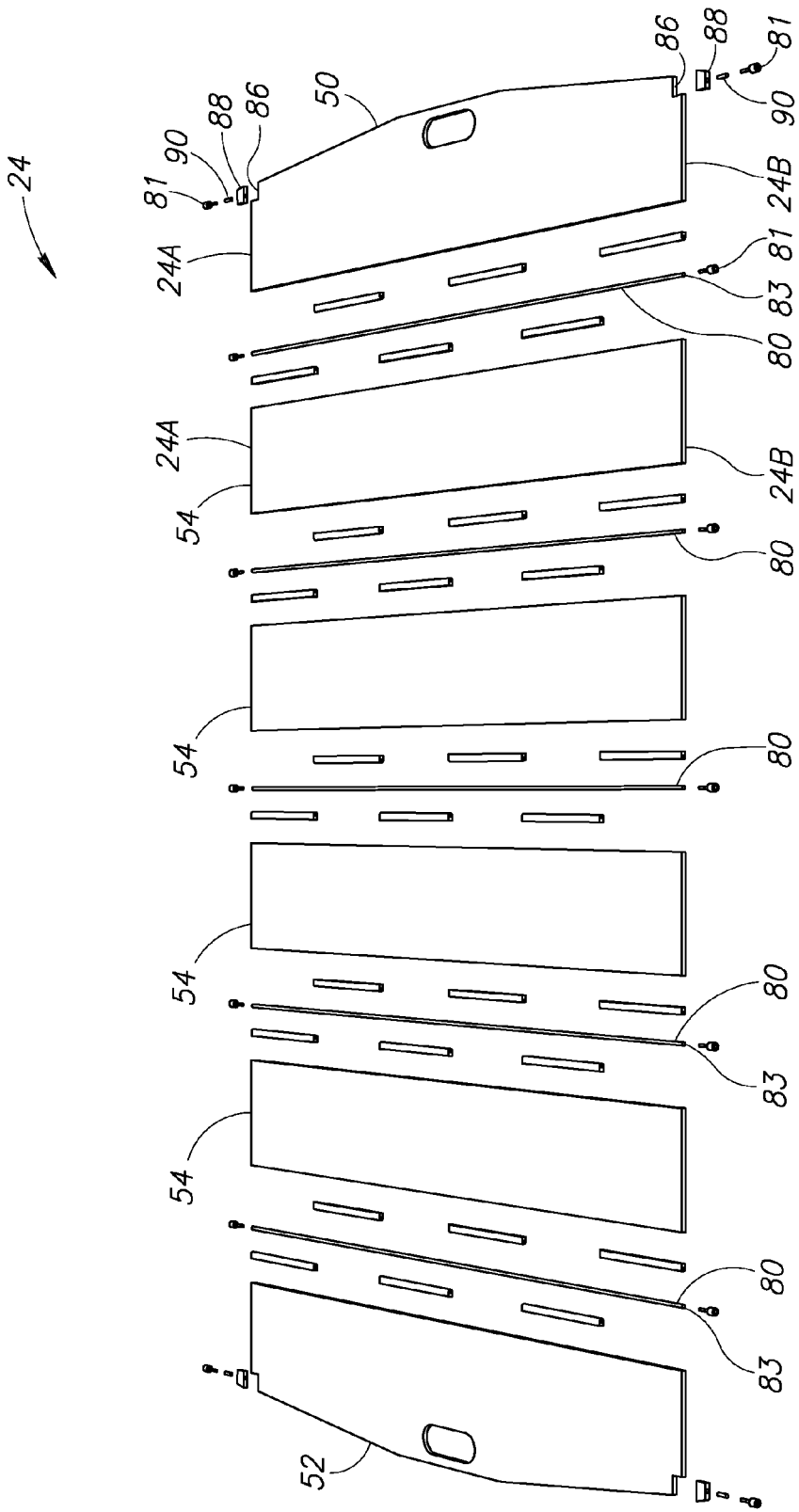
FIG. 13 is a perspective view of the disassembled panels comprising the cover shown in FIG. 10 also showing the axles and wheel assemblies of the cover disassembled and the hinge tab portions separated from the body of each panel of the cover.

The second lateral edge portion 62 of the first end panel segment 50 has three hinge tab portions 66 with a forward first offset pattern, and the first lateral edge portion 60 of the second end panel segment 52 has three hinge tab portions 66 with a rearward second offset pattern. The first lateral edge portion 60 of each of the middle panel segments 54 has three hinge tab portions 66 with the rearward second offset pattern and the second lateral edge portion 62 of each of the middle panel segments 54 has three hinge tab portions 66 with a forward first offset pattern. The three hinge tab portions 66 of each lateral edge portion has an aperture 68 coaxially aligned with the apertures of the other two hinge tab portions of the lateral edge portion. When first panel segment, the second panel segment and the middle panel segments are assembled, the first lateral edge portion 60 of one panel segment are positioned next to the second lateral edge portion 62 of the adjacent panel segment, and the three hinge tab portions 66 of one panel segment interleaf with the three hinge tab portions of the adjacent panel segment, and the apertures 68 of all six hinge tab portions will be in coaxial alignment. An axle 80 (see FIGS. 13 and 16) extends through the coaxially aligned apertures of the six hinge tab portions and serves as a hinge pin to provide a hinged connection between adjacent panel segments. This arrangement provides for flexibility of the cover 24 allowing it to move easily along the curved forward and rearward guide tracks 26A and 26B.

Figure 14:
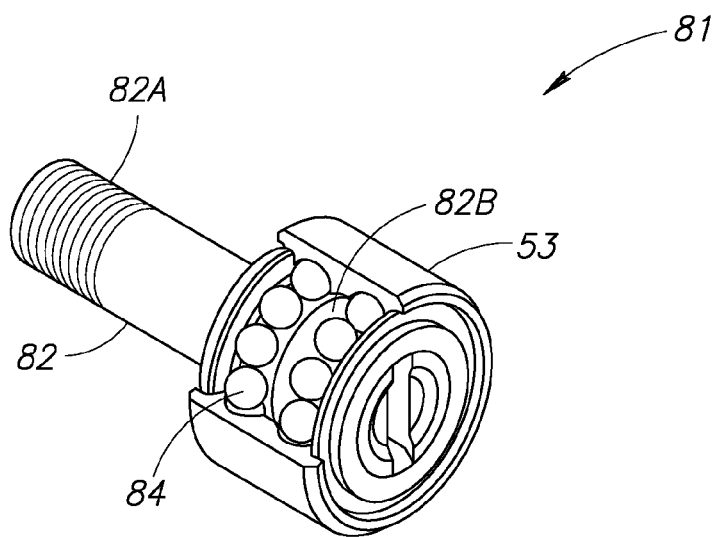
FIG. 14 is a perspective view of a wheel assembly used with the aircraft cargo door shield system of FIG. 1.
Figure 15:
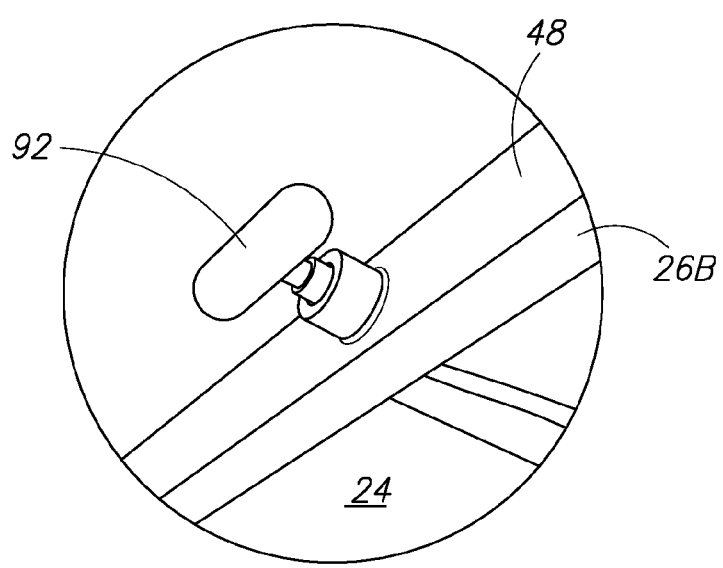
FIG. 15 is an enlarged view of a locking pin shown in FIG. 2.
Figure 16:
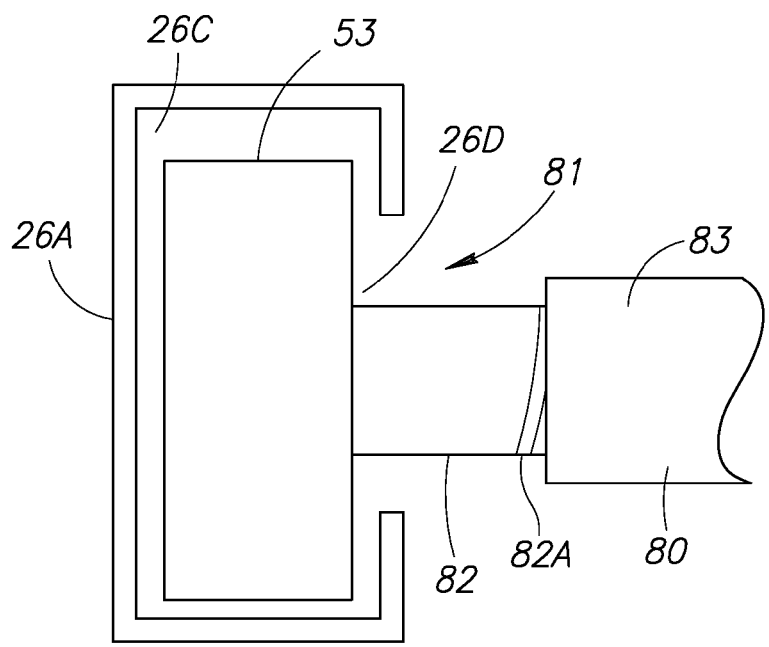
FIG. 16 is an enlarged cross-sectional view of the guide track shown in FIG. 1.
Figure 17:
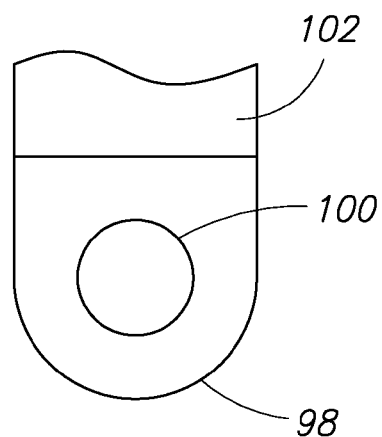
FIG. 17 is an enlarged view of an attachment plate shown in FIG. 1.

The wheels 53 of the cover 24 which are positioned within the channels 26C of the forward and rearward guide tracks 26A and 26B are each part of a wheel assembly 81 shown in FIGS. 14 and 16. Each wheel assembly 81 includes in addition to one of the wheels 53, a mounting shaft 82 having an exteriorly threaded portion 82A and a race portion 82B with ball bearings 84 provided between the race portion and the wheel to facilitate free rotation of the wheel relative to the mounting shaft An end portion 83 of each of the axles 80 is interiorly threaded to threadably receive the exteriorly threaded portion 82A of the mounting shaft 82 of one of the wheel assemblies 81. As shown if FIG. 13, the first lateral edge portion 60 of the first end panel segment 50 and the second later edge portion 62 of the second end panel segment 52 have no axle by which wheel assemblies 81 can be attached, so the forward and rearward corners of both have a recess 86 within which a mounting block 88 is attached to the panel segment. The mounting block 88 has a threaded insert 90 which threadably receives the exteriorly threaded portion 82A of the mounting shaft 82 of one of the wheel assemblies 81.

The channels 26C of the forward and rearward guide tracks 26A and 26B have a C-shape as shown in FIG. 16, and are sized to rollably receive and retain the wheels 53 of the cover 24 therein with the mounting shaft 82 extending out of the side opening 26D of the guide track, and to support the cover 24 and guide the wheels and hence the cover as the cover is moved along the forward and rearward guide tracks 26A and 26B between the shield position 28 and the storage position 30.

Figure 20:
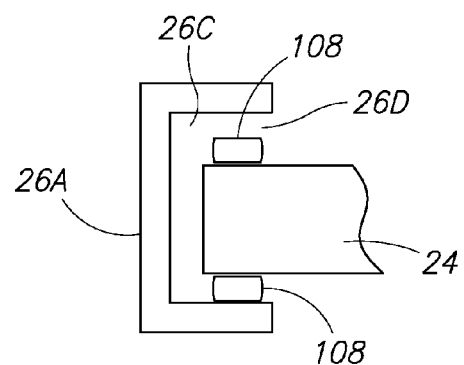
FIG. 20 is an enlarged cross-sectional view of an alternative guide track with the edge portions of the cover extending into the channel and having sliders attached thereto and without the use of wheels.

Alternatively, the cover 24 may use sliders 108 positioned within the channels 26C of the forward and rearward guide tracks 26A and 26B in lieu of the wheels 53 to slidably engage the guide tracks, as shown in FIG. 20.

Figure 19:
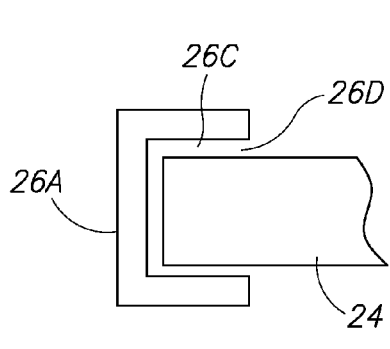
FIG. 19 is an enlarged cross-sectional view of an alternative guide track with the edge portions of the cover extending into the channel and without the use of wheels.

Yet another alternative for the cover 24 is to eliminate the use of wheels and sliders, by having the forward and rearward edge portions of the cover extending into the channels 26C of the forward and rearward guide tracks 26A and 26B as shown in FIG. 19 for guidance of the cover as the cover is moved along the forward and rearward guide tracks 26A and 26B between the shield position 28 and the storage position 30.

Figure 18:
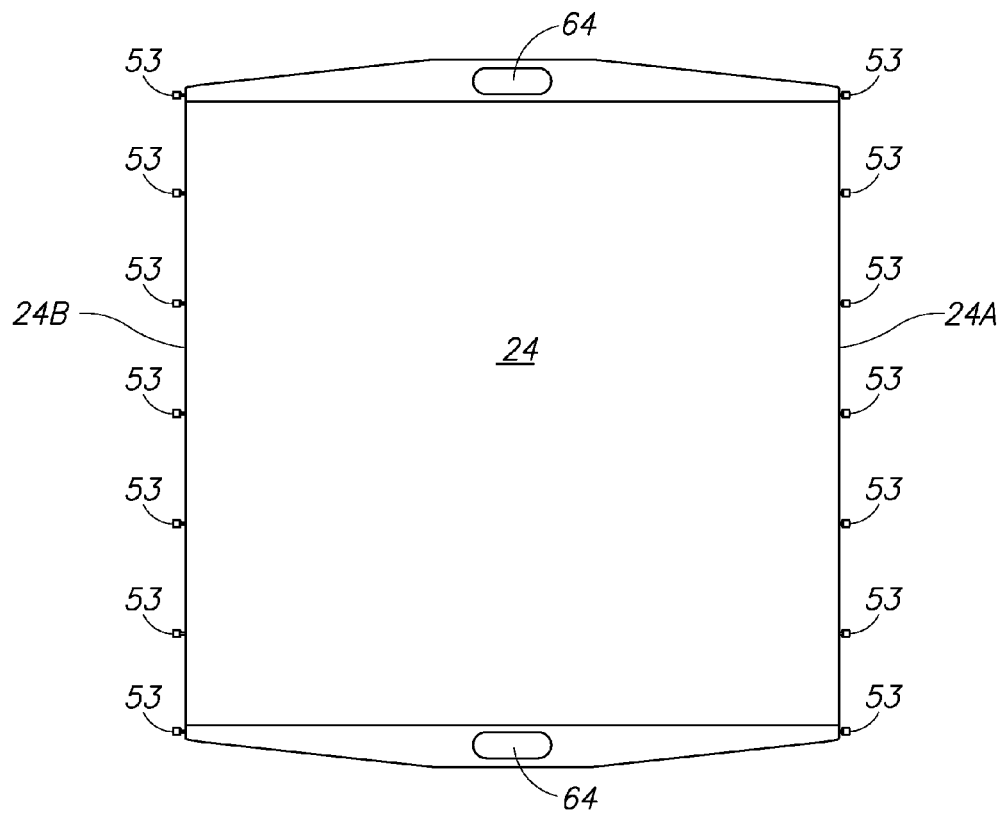
FIG. 18 is a plan view of the front side of an alternative embodiment of the cover using a single flexible sheet and shown disassembled from the aircraft cargo door shield system of FIG. 1 and displayed flat.

An alternative embodiment of cover 24 uses a single flexible sheet or panel 24 as shown in FIG. 18 with wheel assemblies 81 having wheels 53 positioned in the channels 26C of the forward and rearward guide tracks 26A and 26B. Alternatively, the cover may have forward and rearward edge portions extending into the channels 26C of the forward and rearward guide tracks 26A and 26B as shown in FIG. 19 for guidance of the cover as the cover is moved along the forward and rearward guide tracks 26A and 26B between the shield position 28 and the storage position 30, or use sliders 108 as shown in FIG. 20. The cover of this embodiment has sufficient flexibility that it easily bends as it is moved along the curved forward and rearward guide tracks 26A and 26B by a user. In addition, this embodiment may eliminate the need for multiple panels connected together with axles and for wheels. The single flexible panel has sufficient strength and rigidity to support its own weight and not have the edge portions thereof pull out of the channels 26C during normal use and sufficient thickness to prevent damage to the exterior skin 18A of the cargo door 18 is contacted by cargo.

A spring loaded locking pin 92 is attached to the rearward guide track 26B and spring loaded into a locked position with the locking pin projecting into the channel 26C at a location therealong to block movement of the cover 24 from the storage position 30 to the shield position 28 and retain the cover in the storage position during flight or other movement of the aircraft 12. A spring internal to the locking pin 92 biases the locking pin into a locked position projecting into the channel. The locking pin 92 may be manually pulled outward into an unlocked position to release the cover 24 and allow its movement into the shield position 28 in preparation for loading and unloading of cargo through the doorway 16. When the cover 24 is move toward the storage position 30 and engages the locking pin 92, the locking pin is constructed to allow the motion of the cover to push the locking pin outward against the inward bias of the spring into the unlocked position and once the cover fully passes by the locking pin the spring automatically moves the locking pin back into the locked position.

Similarly, a spring loaded locking pin 94 is attached to the rearward guide track 26B and spring loaded into a locked position with the locking pin projecting into the channel 26C at a location therealong to block movement of the cover 24 from the shield position 28 to the storage position 30 and retain the cover in the shield position during the loading and unloading of cargo through the doorway 16. A spring internal to the locking pin 94 biases the locking pin into a locked position projecting into the channel. The locking pin 94 may be manually pulled outward into an unlocked position to release the cover 24 and allow its movement into the storage position 30 in preparation for flight or other movement of the aircraft 12. When the cover 24 is move toward the shield position 28 and engages the locking pin 94, the locking pin is constructed to allow the motion of the cover to push the locking pin outward against the inward bias of the spring into the unlocked position and once the cover fully passes by the locking pin the spring automatically moves the locking pin back into the locked position.

The forward and rearward guide tracks 26A and 26B are easily and quickly installed in the aircraft 12 by attachment to the ceiling 14B, first interior sidewall 14C and second interior sidewall 14D of the cargo bay 14 without modification of the aircraft by using preexisting cargo net anchor point of the aircraft. Many aircraft use cargo net anchor points which are threaded inserts in the ceiling 14B, first interior sidewall 14C and second interior sidewall 14D of the cargo bay 14 at many positions throughout the cargo bay in which threaded cargo net attachment members 96 are threadably received. The aircraft cargo door shield system 10 of the present invention may be attached using these preexisting threaded inserts and cargo net attachment members 96.

The forward and rearward guide tracks 26A and 26B each have a plurality of flat attachment plates 98, each with an aperture 100 therethrough. The attachment plates 98 are arranged to align with selected ones of the preexisting threaded inserts in the ceiling 14B, first interior sidewall 14C and second interior sidewall 14D of the cargo bay 14 to be used to attach the forward and rearward guide tracks within the cargo bay. The cargo net attachment members 96 in those threaded inserts are first removed, and then the forward and rearward guide tracks are positioned within the cargo bay with the attachment plates 96 of the guide tracks aligned with corresponding ones of the threaded inserts so that the apertures 100 of the attachment plates allow access to the threaded apertures of the threaded inserts. Next, the threaded shafts of the original cargo net attachment members 96 are inserted and screwed tightly into the threaded inserts, thereby sandwiching the attachment plates 98 of the guide tracks between the cargo net attachment members 96 and the surface of the ceiling 14B, first interior sidewall 14C or second interior sidewall 14D, to securely anchor the forward and rearward guide tracks 26A and 26B in place within the cargo bay without having to modify the ceiling or interior sidewalls of the cargo bay. To accommodate slight variations in the locations of the threaded inserts, the apertures 100 of the attachment plates 98 may be made elongated in shape. Of course, if the cargo net attachment members used in a particular aircraft use two threaded inserts, the attachment plates 98 can each use two apertures 100 or a single elongated aperture arranged to match the two threaded inserts.

In some locations the attachment plates 98 may attach directly to the forward and rearward guide tracks 26A and 26B. However, in other locations where the guide track is spaced away from the ceiling 14B, first interior sidewall 14C or second interior sidewall 14D, the attachment plates 98 are attached to one end of a leg 102 which has the other end attached to the forward or rearward track.

If a separate bolt, screw or other fastener is used to secure the cargo net attachment members 96 to the ceiling or interior sidewalls, then the fasteners and the cargo net attachment members are removed and next the attachment plates 98 aligned with the threaded anchors and each cargo net attachment members is also aligned with one of the threaded inserts and the fastener is threaded into the threaded insert.

The spacing between the first lengthwise sections 38 of the forward and rearward guide tracks 26A and 26B and the cargo door 18 when in the fully opened position 21 is sufficiently large that when the cover 24 is moved into the shield position 28 below the exterior skin 18A of the cargo door, cargo contacting the cover will not move the cover upward sufficiently to hit the exterior skin of the cargo door.

In some aircraft 12, the cargo door 18 has a pull cord 104 attached to it and secured at points within the cargo bay 14 to permit the user to manually move the door by pulling on the pull cord. In the illustrated aircraft the pull cord 104 passes immediately adjacent to the forward edge portion 24A of the cover 24 when in the shield position 28 and having the forward guide track 26A extend in parallel arrangement with the forward edge portion 24A of the cover would result in interference with the operation of the pull cord. To avoid this, the forward guide track 26A has an forwardly, outwardly curving lengthwise portion 106 (see FIGS. 2 and 7) in the vicinity of the pull cord 104 which permits the pull cord to pass between the curving lengthwise portion 106 and the forward edge portion 24A of the cover 24 when in the shield position 28. The curving lengthwise portion 106 of the forward guide track 26A curves outward sufficiently far that one wheel 53 of the cover when passing by this portion actually moves out of the channel 26C of the forward guide track, but support is lost for only that one wheel. The cover 24 has sufficient rigidity and the other wheels 53 provide sufficient support that the loss of support by the forward guide track 26A of one wheel of the cover does not adversely impact the operation of the cover.

In the preferred embodiment, the forward and rearward guide tracks 26A and 26B may be made of aluminum or carbon fiber with the channels 26C cut or otherwise formed therein. The channels 26C are sizes to allow the wheels 53 to roll freely in the channels, and have a C-shape tending to capture the wheels within the channels except for the curving lengthwise portion 106 of the forward guide track 26A discussed above.

As described above and here, the cargo door shield system 10 has various aspects which may be used in various combinations. The system is illustrated for use in an aircraft cargo bay having a first sidewall and an opposite second sidewall, and a side doorway in the first sidewall with a top hinged, inward rotating cargo door movable between a closed position and a fully opened position wherein an exterior skin thereof is within the cargo bay and facing downward. When installed with the cargo bay the cargo door shield comprises a number of elements, including:

a cargo door cover being movable between a shield position below the exterior skin of the cargo door and sized to extend substantially the full length of the cargo door when the cargo door is in the fully opened position, and a storage position permitting the cargo door to be moved uninhibited by the cover between the closed and fully opened positions, the cover having spaced apart first and second lateral edge portions; and a first guide track having a first end portion located adjacent to a forward side of the side doorway, the first guide track having a first lengthwise section located adjacent to the first cargo bay sidewall, and a second lengthwise section spaced away from the first cargo bay sidewall toward the second cargo bay sidewall, and a second guide track having a first end portion located adjacent to a rearward side of the side doorway, the second guide track having a first lengthwise section located adjacent to the first cargo bay sidewall, and a second lengthwise section spaced away from the first cargo bay sidewall toward the second cargo bay sidewall, the first and second lengthwise sections of the first and second guide tracks movably supporting the cover for movement therealong between the shield position and the stored position, the first lengthwise section of first guide track supporting the first lateral edge portion of the cover when in the shield position and the first lengthwise section of second guide track supporting the second lateral edge portion of the cover when in the shield position, and the second lengthwise section of the first guide track supporting the first lateral edge portion of the cover when in the storage position and the second lengthwise section of the second guide track supporting the second lateral edge portion of the cover when in the storage position, the first lengthwise sections of the first and second guide tracks extending along substantially the full length of the cargo door at a distance below and spaced apart from the cargo door when the cargo door is in the fully opened position, the first lengthwise sections of first and second guide tracks defining an unobstructed space therebetween and being spaced apart sufficient to permit passage of the cargo door through the unobstructed space when the cargo door is moved between the closed position and the fully opened position.

In addition, when used in an aircraft having a cargo bay ceiling with a movable ceiling panel covering a hatch, the first guide track has an intermediate lengthwise section extending between the first and second lengthwise sections of the first guide track, and the second guide track has an intermediate lengthwise section extending between the first and second lengthwise sections of the second guide track, the intermediate lengthwise sections of the first and second guide tracks supporting the cover for movement therealong between the first and second lengthwise sections of the first and second guide tracks, the intermediate lengthwise section of first guide track supporting the first lateral edge portion of the cover and the intermediate lengthwise section of second guide track supporting the second lateral edge portion of the cover when the cover is moving between the first and second lengthwise sections of first and second guide tracks, the intermediate lengthwise sections of first and second guide tracks defining an unobstructed space therebetween in vertical registration with the ceiling panel and being spaced apart sufficient to permit unobstructed usage of the ceiling panel when the cover is in either of the shield position or the storage position.

The cargo door shield system may further include a first cross-member attached to and extending between the first and second guide tracks at a location to a first side of the ceiling panel and a second cross-member attached to and extending between the first and second guide tracks at a location to an opposite second side of the ceiling panel, and a net attached to and extending between the first and second cross-members with at least a portion of the net positioned in vertical registration with the ceiling panel and below the ceiling cover to prevent contact of cargo in the cargo bay with the ceiling panel, the net being removable attached to at least one of the first and second cross-members.

The cargo door shield system may also have the second lengthwise sections of the first and second guide tracks located adjacent to the second cargo bay sidewall.

In the illustrated embodiment, the second lengthwise sections of the first and second guide tracks are located adjacent to the second cargo bay sidewall, and the first guide track has an intermediate lengthwise section extending between the first and second lengthwise sections of the first guide track, and the second guide track has an intermediate lengthwise section extending between the first and second lengthwise sections of the second guide track, the intermediate lengthwise sections of the first and second guide tracks supporting the cover for movement therealong between the first and second lengthwise sections of the first and second guide tracks, the intermediate lengthwise section of first guide track supporting the first lateral edge portion of the cover and the intermediate lengthwise section of second guide track supporting the second lateral edge portion of the cover when the cover is moving between the first and second lengthwise sections of first and second guide tracks.

Further, when used in an aircraft having a cargo bay ceiling, the intermediate lengthwise sections of the first and second guide tracks may be located adjacent to the cargo bay ceiling, and the first lengthwise sections of the first and second guide tracks curve downward from the first end portions thereof located adjacent to the doorway and then upward to the intermediate lengthwise sections of the first and second guide tracks. With this arrangement the curvature of the first lengthwise sections of the first and second guide tracks may substantially match the curvature of the exterior skin of the cargo door when in the fully opened position.

When used in an aircraft having a cargo bay ceiling, the intermediate lengthwise sections of the first and second guide tracks may be located adjacent to the cargo bay ceiling, and the second lengthwise sections of the first and second guide tracks curve outward from the intermediate lengthwise sections of the first and second guide tracks toward the second cargo bay sidewall.

When used in an aircraft having a cargo bay ceiling and a cargo bay floor, the intermediate lengthwise sections of the first and second guide tracks may be located adjacent to the cargo bay ceiling, and the second lengthwise sections of the first and second guide tracks curve outward from the intermediate lengthwise sections of the first and second guide tracks toward the second cargo bay sidewall and then downward toward the cargo bay floor.

The cover may comprise first and second end panels and a plurality of panels positioned therebetween, the panels being hingedly attached to each adjacent panel. Each of the panels may have a first lateral edge portion and a second lateral edge portion, the first lateral edge portion of the cover comprising the first lateral edge portions of the panels, and the second lateral edge portion of the cover comprising the second lateral edge portions of the panels, and each of the first lateral edge portions of the panels may include at least one wheel rollably supported by the first guide track and each of the second lateral edge portions of the panels includes at least one wheel rollably supported by the second guide track.

Each of the panels may have a first lateral edge portion and a second lateral edge portion, the first lateral edge portion of the cover comprising the first lateral edge portions of the panels, and the second lateral edge portion of the cover comprising the second lateral edge portions of the panels, and each of the first lateral edge portions of the panels may include at least one sliding member slidably supported by the first guide track and each of the second lateral edge portions of the panels includes at least one sliding member slidably supported by the second guide track.

Each of the panels may have a first lateral edge portion and a second lateral edge portion, the first lateral edge portion of the cover comprising the first lateral edge portions of the panels, and the second lateral edge portion of the cover comprising the second lateral edge portions of the panels, and the first lateral edge portions of the panels may be slidably supported by the first guide track and the second lateral edge portions of the panels are slidably supported by the second guide track.

In one of the illustrated versions of the cargo door shield system, the first lateral edge portion of the cover has a plurality of spaced apart wheels rollably supported by the first guide track, and the second lateral edge portion of the cover has a plurality of spaced apart wheels rollably supported by the second guide track. Alternatively, the first lateral edge portion of the cover may be slidably supported by the first guide track, and the second lateral edge portion of the cover may be slidably supported by the second guide track.

The cargo door shield system may also include a locking pin positioned to lock the cover in the shield position against movement along the first and second guide tracks. The locking pin may be constructed to automatically allow movement of the cover along the first and second guide tracks into the shield position and lock the cover in the shield position, and to require manual operation to allow movement of the cover along the first and second guide tracks from the shield position. The cargo door shield system may also include a locking pin positioned to lock the cover in the storage position against movement along the first and second guide tracks. This locking pin may be constructed to automatically allow movement of the cover along the first and second guide tracks into the storage position and lock the cover in the storage position, and to require manual operation to allow movement of the cover along the first and second guide tracks from the storage position.

In one alternative embodiment, the cover comprises a flexible sheet but in most other respects is similar to construction and operation to the first described embodiment of the cover using panels. Whether using the flexible sheet or the panels, the first lateral edge portion of the cover may be slidably supported by the first guide track, and the second lateral edge portion of the cover may be slidably supported by the second guide track.

The cargo door shield system when used with an aircraft having a cargo bay ceiling and cargo net anchors removably attached to the cargo bay ceiling and first and second sidewalls may have the first and second guide tracks each include attachment members configured to be positioned between one of the cargo bay ceiling and first and second sidewalls and the cargo net anchor for securing the first and second guide tracks to the cargo bay ceiling and first and second sidewalls without modification of the cargo bay. Further, the attachment members may be attachment plates. When the cargo net anchors have threaded anchor members and the cargo net anchors include a threaded member sized to be threadedly received in one of the threaded anchor members, the attachment members of the first and second guide tracks may each include an aperture sized to allow passage of the threaded member therethrough to position the attachment members securely between one of the cargo bay ceiling and first and second sidewalls and the cargo net anchor when the threaded member is securely threaded into the threaded anchor member. Again, the attachment members may be attachment plates.

When used with an aircraft having pull cord secured to the cargo door and the cargo bay and positioned to pass immediately adjacent to an edge portion of the cover of the cargo door shield system, the first lengthwise section of the correspondingly positioned one of the first and second guide tracks may have an outwardly curved portion at the location of the pull cord to permit the passage of the pull cord unimpeded between the outwardly curved portion and the cover when the cover is moved between the shield position and the stored position.

Generally, the second lengthwise sections of the first and second guides may be located adjacent to the cargo bay ceiling.

While described above using guide tracks, the cargo door shield system may use a forward guide having a first lengthwise section located adjacent to the first cargo bay sidewall and a second lengthwise section spaced away from the first cargo bay sidewall toward the second cargo bay sidewall, and a rearward guide having a first lengthwise section located adjacent to the first cargo bay sidewall and a second lengthwise section spaced away from the first cargo bay sidewall toward the second cargo bay sidewall. The first and second lengthwise sections of the first and second guides are movably supporting the cover for movement therealong between the shield position and the stored position, with the first lengthwise sections of the first and second guides extending along the cargo door at a distance below and spaced apart from the cargo door when the cargo door is in the fully opened position, and with the first lengthwise sections of first and second guides defining an unobstructed space therebetween and being spaced apart sufficient to permit passage of the cargo door through the unobstructed space when the cargo door is moved between the closed position and the fully opened position.

When used in an aircraft having a cargo bay ceiling with a movable ceiling panel covering a hatch, the first guide may have an intermediate lengthwise section extending between the first and second lengthwise sections of the first guide, and the second guide has an intermediate lengthwise section extending between the first and second lengthwise sections of the second guide. The intermediate lengthwise sections of the first and second guides support the cover for movement therealong between the first and second lengthwise sections of the first and second guides, and the intermediate lengthwise sections of first and second guides define an unobstructed space therebetween in vertical registration with the ceiling panel and being spaced apart sufficient to permit unobstructed usage of the ceiling panel when the cover is in either of the shield position or the storage position.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cargo door shield system for use in an aircraft cargo bay having a first sidewall and an opposite second sidewall, and a side doorway in the first sidewall with a top hinged, inward rotating cargo door movable between a closed position and a fully opened position wherein an exterior skin thereof is within the cargo bay and facing downward, when installed with the cargo bay the cargo door shield comprising:

a cargo door cover being movable between a shield position below the exterior skin of the cargo door and sized to extend substantially the full length of the cargo door when the cargo door is in the fully opened position, and a storage position permitting the cargo door to be moved uninhibited by the cover between the closed and fully opened positions, the cover having spaced apart first and second lateral edge portions; and a first guide track having a first end portion located adjacent to a forward side of the side doorway, the first guide track having a first lengthwise section located adjacent to the first cargo bay sidewall, and a second lengthwise section spaced away from the first cargo bay sidewall toward the second cargo bay sidewall, and a second guide track having a first end portion located adjacent to a rearward side of the side doorway, the second guide track having a first lengthwise section located adjacent to the first cargo bay sidewall, and a second lengthwise section spaced away from the first cargo bay sidewall toward the second cargo bay sidewall, the first and second lengthwise sections of the first and second guide tracks movably supporting the cover for movement therealong between the shield position and the stored position, the first lengthwise section of first guide track supporting the first lateral edge portion of the cover when in the shield position and the first lengthwise section of second guide track supporting the second lateral edge portion of the cover when in the shield position, and the second lengthwise section of the first guide track supporting the first lateral edge portion of the cover when in the storage position and the second lengthwise section of the second guide track supporting the second lateral edge portion of the cover when in the storage position, the first lengthwise sections of the first and second guide tracks extending along substantially the full length of the cargo door at a distance below and spaced apart from the cargo door when the cargo door is in the fully opened position, the first lengthwise sections of first and second guide tracks defining an unobstructed space therebetween and being spaced apart sufficient to permit passage of the cargo door through the unobstructed space when the cargo door is moved between the closed position and the fully opened position.

2. The cargo door shield system of claim 1 for use in an aircraft having a cargo bay ceiling with a movable ceiling panel covering a hatch, wherein the first guide track has an intermediate lengthwise section extending between the first and second lengthwise sections of the first guide track, and the second guide track has an intermediate lengthwise section extending between the first and second lengthwise sections of the second guide track, the intermediate lengthwise sections of the first and second guide tracks supporting the cover for movement therealong between the first and second lengthwise sections of the first and second guide tracks, the intermediate lengthwise section of first guide track supporting the first lateral edge portion of the cover and the intermediate lengthwise section of second guide track supporting the second lateral edge portion of the cover when the cover is moving between the first and second lengthwise sections of first and second guide tracks, the intermediate lengthwise sections of first and second guide tracks defining an unobstructed space therebetween in vertical registration with the ceiling panel and being spaced apart sufficient to permit unobstructed usage of the ceiling panel when the cover is in either of the shield position or the storage position.

3. The cargo door shield system of claim 2, further including a first cross-member attached to and extending between the first and second guide tracks at a location to a first side of the ceiling panel and a second cross-member attached to and extending between the first and second guide tracks at a location to an opposite second side of the ceiling panel, and a net attached to and extending between the first and second cross-members with at least a portion of the net positioned in vertical registration with the ceiling panel and below the ceiling cover to prevent contact of cargo in the cargo bay with the ceiling panel, the net being removable attached to at least one of the first and second cross-members.

4. The cargo door shield system of claim 1, wherein the second lengthwise sections of the first and second guide tracks are located adjacent to the second cargo bay sidewall.

5. The cargo door shield system of claim 1, wherein the second lengthwise sections of the first and second guide tracks are located adjacent to the second cargo bay sidewall, and the first guide track has an intermediate lengthwise section extending between the first and second lengthwise sections of the first guide track, and the second guide track has an intermediate lengthwise section extending between the first and second lengthwise sections of the second guide track, the intermediate lengthwise sections of the first and second guide tracks supporting the cover for movement therealong between the first and second lengthwise sections of the first and second guide tracks, the intermediate lengthwise section of first guide track supporting the first lateral edge portion of the cover and the intermediate lengthwise section of second guide track supporting the second lateral edge portion of the cover when the cover is moving between the first and second lengthwise sections of first and second guide tracks.

6. The cargo door shield system of claim 5 for use in an aircraft having a cargo bay ceiling, wherein the intermediate lengthwise sections of the first and second guide tracks are located adjacent to the cargo bay ceiling, and the first lengthwise sections of the first and second guide tracks curve downward from the first end portions thereof located adjacent to the doorway and then upward to the intermediate lengthwise sections of the first and second guide tracks.

7. The cargo door shield system of claim 6, wherein the curvature of the first lengthwise sections of the first and second guide tracks substantially match the curvature of the exterior skin of the cargo door when in the fully opened position.

8. The cargo door shield system of claim 5 for use in an aircraft having a cargo bay ceiling, wherein the intermediate lengthwise sections of the first and second guide tracks are located adjacent to the cargo bay ceiling, and the second lengthwise sections of the first and second guide tracks curve outward from the intermediate lengthwise sections of the first and second guide tracks toward the second cargo bay sidewall.

9. The cargo door shield system of claim 5 for use in an aircraft having a cargo bay ceiling and a cargo bay floor, wherein the intermediate lengthwise sections of the first and second guide tracks are located adjacent to the cargo bay ceiling, and the second lengthwise sections of the first and second guide tracks curve outward from the intermediate lengthwise sections of the first and second guide tracks toward the second cargo bay sidewall and then downward toward the cargo bay floor.

10. The cargo door shield system of claim 1, wherein the cover comprises first and second end panels and a plurality of panels positioned therebetween, the panels being hingedly attached to each adjacent panel.

11. The cargo door shield system of claim 10, wherein each of the panels has a first lateral edge portion and a second lateral edge portion, the first lateral edge portion of the cover comprising the first lateral edge portions of the panels, and the second lateral edge portion of the cover comprising the second lateral edge portions of the panels, and wherein each of the first lateral edge portions of the panels includes at least one wheel rollably supported by the first guide track and each of the second lateral edge portions of the panels includes at least one wheel rollably supported by the second guide track.

12. The cargo door shield system of claim 10, wherein each of the panels has a first lateral edge portion and a second lateral edge portion, the first lateral edge portion of the cover comprising the first lateral edge portions of the panels, and the second lateral edge portion of the cover comprising the second lateral edge portions of the panels, and wherein each of the first lateral edge portions of the panels includes at least one sliding member slidably supported by the first guide track and each of the second lateral edge portions of the panels includes at least one sliding member slidably supported by the second guide track.

13. The cargo door shield system of claim 10, wherein each of the panels has a first lateral edge portion and a second lateral edge portion, the first lateral edge portion of the cover comprising the first lateral edge portions of the panels, and the second lateral edge portion of the cover comprising the second lateral edge portions of the panels, and wherein the first lateral edge portions of the panels are slidably supported by the first guide track and the second lateral edge portions of the panels are slidably supported by the second guide track.

14. The cargo door shield system of claim 10, wherein the first and second end panels include a handhold for use by a user.

15. The cargo door shield system of claim 1, wherein the first lateral edge portion of the cover has a plurality of spaced apart wheels rollably supported by the first guide track, and the second lateral edge portion of the cover has a plurality of spaced apart wheels rollably supported by the second guide track.

16. The cargo door shield system of claim 1, wherein the first lateral edge portion of the cover is slidably supported by the first guide track, and the second lateral edge portion of the cover is slidably supported by the second guide track.

17. The cargo door shield system of claim 1, further including a locking pin positioned to lock the cover in the shield position against movement along the first and second guide tracks.

18. The cargo door shield system of claim 17, wherein the locking pin is constructed to automatically allow movement of the cover along the first and second guide tracks into the shield position and lock the cover in the shield position, and to require manual operation to allow movement of the cover along the first and second guide tracks from the shield position.

19. The cargo door shield system of claim 1, further including a locking pin positioned to lock the cover in the storage position against movement along the first and second guide tracks.

20. The cargo door shield system of claim 19, wherein the locking pin is constructed to automatically allow movement of the cover along the first and second guide tracks into the storage position and lock the cover in the storage position, and to require manual operation to allow movement of the cover along the first and second guide tracks from the storage position.

21. The cargo door shield system of claim 1, wherein the cover comprises a flexible sheet.

22. The cargo door shield system of claim 21, wherein the first lateral edge portion of the cover is slidably supported by the first guide track, and the second lateral edge portion of the cover is slidably supported by the second guide track.

23. The cargo door shield system of claim 1 for use with an aircraft having a cargo bay ceiling and cargo net anchors removably attached to the cargo bay ceiling and first and second sidewalls, wherein the first and second guide tracks each include attachment members configured to be positioned between one of the cargo bay ceiling and first and second sidewalls and the cargo net anchor for securing the first and second guide tracks to the cargo bay ceiling and first and second sidewalls without modification of the cargo bay.

24. The cargo door shield system of claim 23, wherein the attachment members are attachment plates.

25. The cargo door shield system of claim 23 for use with an aircraft having cargo net anchors having a threaded anchor members in the cargo bay ceiling and first and second sidewalls, and the cargo net anchors include a threaded member sized to be threadedly received in one of the threaded anchor members, wherein the attachment members of the first and second guide tracks each include an aperture sized to allow passage of the threaded member therethrough to position the attachment members securely between one of the cargo bay ceiling and first and second sidewalls and the cargo net anchor when the threaded member is securely threaded into the threaded anchor member.

26. The cargo door shield system of claim 25, wherein the attachment members are attachment plates.

27. The cargo door shield system of claim 1 for use with an aircraft having pull cord secured to the cargo door and the cargo bay and positioned to pass immediately adjacent to an edge portion of the cover of the cargo door shield system, wherein the first lengthwise section of the correspondingly positioned one of the first and second guide tracks has a an outwardly curved portion at the location of the pull cord to permit the passage of the pull cord unimpeded between the outwardly curved portion and the cover when the cover is moved between the shield position and the stored position.

28. The cargo door shield system of claim 1 for use in an aircraft having a cargo bay ceiling, wherein the second lengthwise sections of the first and second guides are located adjacent to the cargo bay ceiling.

29. A cargo door shield system for use in an aircraft cargo bay having a first sidewall and an opposite second sidewall, and a side doorway in the first sidewall with a top hinged, inward rotating cargo door movable between a closed position and a fully opened position wherein an exterior skin thereof is within the cargo bay and facing downward, when installed with the cargo bay the cargo door shield comprising:

a cargo door cover being movable between a shield position below the exterior skin of the cargo door when the cargo door is in the fully opened position, and a storage position permitting the cargo door to be moved uninhibited by the cover between the closed and fully opened positions, the cover having spaced apart forward and rearward edge portions; and a forward first guide having a first lengthwise section located adjacent to the first cargo bay sidewall and a second lengthwise section spaced away from the first cargo bay sidewall toward the second cargo bay sidewall, and a rearward second guide having a first lengthwise section located adjacent to the first cargo bay sidewall and a second lengthwise section spaced away from the first cargo bay sidewall toward the second cargo bay sidewall, the first and second lengthwise sections of the first and second guides movably supporting the cover for movement therealong between the shield position and the stored position, the first lengthwise sections of the first and second guides extending along the cargo door at a distance below and spaced apart from the cargo door when the cargo door is in the fully opened position, the first lengthwise sections of first and second guides defining an unobstructed space therebetween and being spaced apart sufficient to permit passage of the cargo door through the unobstructed space when the cargo door is moved between the closed position and the fully opened position.

30. The cargo door shield system of claim 29 for use in an aircraft having a cargo bay ceiling with a movable ceiling panel covering a hatch, wherein the first guide has an intermediate lengthwise section extending between the first and second lengthwise sections of the first guide, and the second guide has an intermediate lengthwise section extending between the first and second lengthwise sections of the second guide, the intermediate lengthwise sections of the first and second guides supporting the cover for movement therealong between the first and second lengthwise sections of the first and second guides, the intermediate lengthwise sections of first and second guides defining an unobstructed space therebetween in vertical registration with the ceiling panel and being spaced apart sufficient to permit unobstructed usage of the ceiling panel when the cover is in either of the shield position or the storage position.

31. The cargo door shield system of claim 30, further including a first cross-member attached to and extending between the first and second guides at a location to a first side of the ceiling panel and a second cross-member attached to and extending between the first and second guide tracks at a location to an opposite second side of the ceiling panel, and a net attached to and extending between the first and second cross-members with at least a portion of the net positioned in vertical registration with the ceiling panel and below the ceiling cover to prevent contact of cargo in the cargo bay with the ceiling panel.

32. The cargo door shield system of claim 29, wherein the second lengthwise sections of the first and second guides are located adjacent to the second cargo bay sidewall.

33. The cargo door shield system of claim 29, wherein the second lengthwise sections of the first and second guides are located adjacent to the second cargo bay sidewall, and the first guide has an intermediate lengthwise section extending between the first and second lengthwise sections of the first guide, and the second guide has an intermediate lengthwise section extending between the first and second lengthwise sections of the second guide, the intermediate lengthwise sections of the first and second guide tracks supporting the cover for movement therealong between the first and second lengthwise sections of the first and second guides.

34. The cargo door shield system of claim 33 for use in an aircraft having a cargo bay ceiling, wherein the intermediate lengthwise sections of the first and second guides are located adjacent to the cargo bay ceiling, and the first lengthwise sections of the first and second guides curve downward from the first cargo bay sidewall and then upward to the intermediate lengthwise sections of the first and second guides.

35. The cargo door shield system of claim 33 for use in an aircraft having a cargo bay ceiling, wherein the intermediate lengthwise sections of the first and second guides are located adjacent to the cargo bay ceiling, and the second lengthwise sections of the first and second guides curve outward from the intermediate lengthwise sections of the first and second guides toward the second cargo bay sidewall.

36. The cargo door shield system of claim 33 for use in an aircraft having a cargo bay ceiling and a cargo bay floor, wherein the intermediate lengthwise sections of the first and second guides are located adjacent to the cargo bay ceiling, and the second lengthwise sections of the first and second guides curve outward from the intermediate lengthwise sections of the first and second guides toward the second cargo bay sidewall and then downward toward the cargo bay floor.

37. The cargo door shield system of claim 29, wherein the cover comprises first and second end panels and a plurality of panels positioned therebetween, the panels being hingedly attached to each adjacent panel.

38. The cargo door shield system of claim 37, wherein each of the panels has a first lateral edge portion and a second lateral edge portion, and each of the first lateral edge portions of the panels includes at least one wheel rollably supported by the first guide and each of the second lateral edge portions of the panels includes at least one wheel rollably supported by the second guide.

39. The cargo door shield system of claim 29, wherein a first lateral edge portion of the cover has a plurality of spaced apart wheels rollably supported by the first guide, and an opposite second lateral edge portion of the cover has a plurality of spaced apart wheels rollably supported by the second guide.

40. The cargo door shield system of claim 29, wherein a first lateral edge portion of the cover is supported for movement therealong by the first guide, and an opposite second lateral edge portion of the cover is supported for movement therealong by the second guide.

41. The cargo door shield system of claim 29, further including a locking pin positioned to lock the cover in the shield position against movement along the first and second guides.

42. The cargo door shield system of claim 41, wherein the locking pin is constructed to automatically allow movement of the cover along the first and second guides into the shield position and lock the cover in the shield position, and to require manual operation to allow movement of the cover along the first and second guides from the shield position.

43. The cargo door shield system of claim 29, further including a locking pin positioned to lock the cover in the storage position against movement along the first and second guides.

44. The cargo door shield system of claim 43, wherein the locking pin is constructed to automatically allow movement of the cover along the first and second guides into the storage position and lock the cover in the storage position, and to require manual operation to allow movement of the cover along the first and second guides from the storage position.

45. The cargo door shield system of claim 29, wherein the cover comprises a flexible sheet.

46. The cargo door shield system of claim 29 for use with an aircraft having a cargo bay ceiling and cargo net anchors removably attached to the cargo bay ceiling and first and second sidewalls, wherein the first and second guides each include attachment members configured to be positioned between one of the cargo bay ceiling and first and second sidewalls and the cargo net anchor for securing the first and second guides to the cargo bay ceiling and first and second sidewalls without modification of the cargo bay.

47. The cargo door shield system of claim 29 for use with an aircraft having pull cord secured to the cargo door and the cargo bay and positioned to pass immediately adjacent to an edge portion of the cover of the cargo door shield system, wherein the first lengthwise section of the correspondingly positioned one of the first and second guides has a an outwardly curved portion at the location of the pull cord to permit the passage of the pull cord unimpeded between the outwardly curved portion and the cover when the cover is moved between the shield position and the stored position.

48. The cargo door shield system of claim 29 for use in an aircraft having a cargo bay ceiling, wherein the second lengthwise sections of the first and second guides are located adjacent to the cargo bay ceiling.

* * * * *